US011643860B2

(12) United States Patent
Choi

(10) Patent No.: US 11,643,860 B2
(45) Date of Patent: May 9, 2023

(54) VEHICLE DOOR OPENING AND CLOSING APPARATUS

(71) Applicants: Hyundai Motor Company, Seoul (KR); Kia Motors Corporation, Seoul (KR)

(72) Inventor: Je Won Choi, Anyang-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 295 days.

(21) Appl. No.: 17/014,197

(22) Filed: Sep. 8, 2020

(65) Prior Publication Data

US 2021/0172236 A1 Jun. 10, 2021

(30) Foreign Application Priority Data

Dec. 10, 2019 (KR) ........................ 10-2019-0164178

(51) Int. Cl.
*B60J 5/04* (2006.01)
*E05F 15/638* (2015.01)
(Continued)

(52) U.S. Cl.
CPC .......... *E05F 15/638* (2015.01); *E05F 15/619* (2015.01); *E05F 15/655* (2015.01);
(Continued)

(58) Field of Classification Search
CPC ..... E05F 15/638; E05F 15/619; E05F 15/655; E05Y 2201/22; E05Y 2201/224;
(Continued)

(56) References Cited

U.S. PATENT DOCUMENTS 5,992,097 A * 11/1999 Makiuchi ............ E05D 15/0691
49/216
7,669,367 B2 * 3/2010 Shimura ............. E05D 15/1047
49/213
(Continued)

FOREIGN PATENT DOCUMENTS

CN 105984310 A * 10/2016 ............. B60J 5/047
CN 105984311 A * 10/2016 ............. B60J 5/047
(Continued)

*Primary Examiner* — Jerry E Redman
(74) *Attorney, Agent, or Firm* — Slater Matsil, LLP

(57) ABSTRACT

A vehicle includes a body having a door frame defining a door aperture, a vehicle door, a rail mounted on the body, a roller unit mounted on the vehicle door and configured to move along the rail and allow the vehicle door to open and close in a sliding mode and a swing mode, a center rail extending from an edge of the door aperture, a center roller unit including rollers configured to be guided along the center rail, a roller bracket having the rollers mounted thereon, a roller-side hinge element connected to the roller bracket, and a door-side hinge element rotatably connected to the roller-side hinge element by a hinge pin, a door-side docking unit releasably connecting the door-side hinge element to the vehicle door, and a frame-side docking unit releasably connecting the roller-side hinge element to the door frame.

20 Claims, 39 Drawing Sheets

(51) Int. Cl.
*E05F 15/619* (2015.01)
*E05F 15/655* (2015.01)

(52) U.S. Cl.
CPC ... *E05Y 2201/682* (2013.01); *E05Y 2201/684* (2013.01); *E05Y 2201/688* (2013.01); *E05Y 2201/716* (2013.01); *E05Y 2201/722* (2013.01); *E05Y 2600/622* (2013.01); *E05Y 2600/626* (2013.01); *E05Y 2800/102* (2013.01); *E05Y 2900/531* (2013.01)

(58) Field of Classification Search
CPC ........... E05Y 2201/41; E05Y 2201/422; E05Y 2201/626; E05Y 2201/684; E05Y 2201/688; E05Y 2201/716; E05Y 2201/722; E05Y 2800/102; E05Y 2900/531; E05B 81/16
USPC ........................... 49/254, 257, 258, 259, 360
See application file for complete search history.

(56) References Cited

U.S. PATENT DOCUMENTS

| | | | | |
|---|---|---|---|---|
| 8,234,816 | B2 * | 8/2012 | Heuel | E05D 3/127 49/211 |
| 10,384,519 | B1 * | 8/2019 | Brown | E05F 15/632 |
| 11,472,271 | B2 * | 10/2022 | Choi | B60J 5/06 |
| 11,512,515 | B2 * | 11/2022 | Choi | B60J 5/0473 |
| 2006/0059783 | A1 * | 3/2006 | Braun | E05B 83/40 49/360 |
| 2012/0031004 | A1 * | 2/2012 | Boettcher | E05D 15/101 49/154 |
| 2016/0272054 | A1 * | 9/2016 | Maruyama | B60J 5/06 |
| 2018/0119465 | A1 * | 5/2018 | Wojdyla | E05D 3/04 |
| 2020/0399944 | A1 * | 12/2020 | Morioka | E05F 15/646 |
| 2021/0079703 | A1 * | 3/2021 | Yun | E05D 15/30 |
| 2021/0140215 | A1 * | 5/2021 | Choi | E05B 83/38 |
| 2021/0140216 | A1 * | 5/2021 | Choi | E05D 15/1042 |
| 2021/0170839 | A1 * | 6/2021 | Choi | E05D 15/0604 |
| 2021/0170842 | A1 * | 6/2021 | Choi | E05D 15/1047 |
| 2021/0172228 | A1 * | 6/2021 | Choi | E05D 15/48 |
| 2021/0172235 | A1 * | 6/2021 | Choi | E05F 15/619 |
| 2021/0172236 | A1 * | 6/2021 | Choi | E05F 15/619 |
| 2021/0172237 | A1 * | 6/2021 | Choi | E05F 15/655 |
| 2021/0180370 | A1 * | 6/2021 | Oda | E05B 81/32 |
| 2022/0090421 | A1 * | 3/2022 | Choi | B60J 5/047 |
| 2022/0090427 | A1 * | 3/2022 | Choi | E05B 83/38 |
| 2022/0243502 | A1 * | 8/2022 | Itonaga | E05B 81/32 |

FOREIGN PATENT DOCUMENTS

| | | | | | |
|---|---|---|---|---|---|
| CN | 105984312 | A | * | 10/2016 | B60J 5/047 |
| CN | 115003530 | A | * | 9/2022 | E05D 15/0665 |
| DE | 102020110154 | A1 | * | 6/2021 | B60J 5/06 |
| EP | 1788177 | A1 | * | 5/2007 | B60J 5/06 |
| KR | 20210057616 | A | | 5/2021 | |

* cited by examiner

VEHICLE DOOR OPENING AND CLOSING APPARATUS

CROSS-REFERENCE TO RELATED APPLICATIONS

This application claims the benefit of Korean Patent Application No. 10-2019-0164178, filed on Dec. 10, 2019, in the Korean Intellectual Property Office, which application is hereby incorporated herein by reference.

TECHNICAL FIELD

The present disclosure relates to a vehicle door opening and closing apparatus.

BACKGROUND

Vehicles have door apertures for ingress and egress of vehicle passengers to and from a passenger compartment. A vehicle door is closed to block the door aperture and is opened to enable ingress and egress of passengers to and from the passenger compartment through the door aperture. Vehicle doors are divided into swing doors and sliding doors. The swing door is opened and closed by swinging around a hinge mounted between the swing door and the vehicle body. The sliding door is opened and closed by sliding a roller mounted on the sliding door along a rail mounted on the vehicle body.

The swing door is very easy to open and close, thereby enabling quick ingress and egress of passengers. However, when the swing door is opened, a space for ingress and egress is relatively small. When the vehicle is located in a narrow space, a swing trajectory of the door is not secured, which makes the opening and closing operation thereof difficult.

The sliding door is very easy to open and close even when the vehicle is located in a narrow space. When the sliding door is opened, a space for ingress and egress is relatively large. However, the sliding door requires relatively more force and time to open and close, which hinders quick ingress and egress of passengers.

According to the related art, as a vehicle door is operated by a single opening and closing method, it may be difficult to adequately respond to the needs of customers seeking ease of use, diversity, and novelty.

The above information described in this background section is provided to assist in understanding the background of the inventive concept, and may include any technical concept which is not considered as the prior art that is already known to those skilled in the art.

SUMMARY

Embodiments of the present disclosure solve problems occurring in the prior art while advantages achieved by the prior art are maintained intact.

The present disclosure relates to a vehicle door opening and closing apparatus. Particular embodiments relate to a vehicle door opening and closing apparatus allowing a vehicle door to open and close in one mode selected from a swing mode and a sliding mode, and more particularly to a vehicle door opening and closing apparatus allowing a center roller unit to be releasably connected to a vehicle door and a door frame of a vehicle body as either a swing mode or a sliding mode is selected, thereby reliably opening and closing the vehicle door in either the swing mode or the sliding mode.

An aspect of the present disclosure provides a vehicle door opening and closing apparatus allowing a vehicle door to open and close in one mode selected from a swing mode and a sliding mode, and more particularly, allowing a center roller unit to be releasably connected to the vehicle door and a door frame of a vehicle body as either the swing mode or the sliding mode is selected, thereby reliably opening and closing the vehicle door in either the swing mode or the sliding mode.

According to an aspect of the present disclosure, a vehicle door opening and closing apparatus may include a vehicle body having a door frame defining a door aperture, a vehicle door, a rail mounted on the vehicle body, a roller unit mounted on the vehicle door, moving along the rail, and allowing the vehicle door to open and close in one mode selected from a sliding mode and a swing mode, a center rail extending from an edge of the door aperture, a center roller unit including rollers guided along the center rail, a roller bracket having the rollers mounted thereon, a roller-side hinge element connected to the roller bracket, and a door-side hinge element rotatably connected to the roller-side hinge element by a hinge pin, a door-side docking unit releasably connecting the door-side hinge element to the vehicle door, and a frame-side docking unit releasably connecting the roller-side hinge element to the door frame.

The door-side docking unit may include a door-side bracket fixed to the vehicle door, a first door-side clamp member slidably mounted on the door-side bracket, and a second door-side clamp member opposite to the first door-side clamp member, and slidably mounted on the door-side bracket.

The first and second door-side clamp members may be movable in a direction approaching or moving away from the door-side bracket.

The first door-side clamp member may have a first door-side grip portion extending toward the second door-side clamp member, and the second door-side clamp member may have a second door-side grip portion extending toward the first door-side clamp member.

The door-side bracket may have a door-side cavity, the first door-side clamp member may have a first door-side rack portion movably received in the door-side cavity, the second door-side clamp member may have a second door-side rack portion movably received in the door-side cavity, and the first and second door-side rack portions may be moved by a door-side pinion.

The door-side pinion may be disposed between the first door-side rack portion and the second door-side rack portion, the first door-side rack portion may have first door-side rack teeth meshing with the door-side pinion, and the second door-side rack portion may have second door-side rack teeth meshing with the door-side pinion.

The frame-side docking unit may include a frame-side bracket fixed to the door frame, a first frame-side clamp member slidably mounted on the frame-side bracket, and a second frame-side clamp member opposite to the first frame-side clamp member, and slidably mounted on the frame-side bracket.

The first and second frame-side clamp members may be movable in a direction approaching or moving away from the frame-side bracket.

The first frame-side clamp member may have a first frame-side grip portion extending toward the second frame-side clamp member, and the second frame-side clamp member may have a second frame-side grip portion extending toward the first frame-side clamp member.

The frame-side bracket may have a frame-side cavity, the first frame-side clamp member may have a first frame-side rack portion movably received in the frame-side cavity, the second frame-side clamp member may have a second frame-side rack portion movably received in the frame-side cavity, and the first and second frame-side rack portions may be moved by a frame-side pinion.

The frame-side pinion may be disposed between the first frame-side rack portion and the second frame-side rack portion, the first frame-side rack portion may have first frame-side rack teeth meshing with the frame-side pinion, and the second frame-side rack portion may have second frame-side rack teeth meshing with the frame-side pinion.

The frame-side docking unit may have a guide projection, and the roller-side hinge element may have a guide hole into which the guide projection is inserted.

The door-side docking unit may include a door-side bracket fixed to the vehicle door, a first door-side clamp member pivotally mounted on the door-side bracket, and a second door-side clamp member opposite to the first door-side clamp member, and pivotally mounted on the door-side bracket.

The frame-side docking unit may include a frame-side bracket fixed to the door frame, a first frame-side clamp member pivotally mounted on the frame-side bracket, and a second frame-side clamp member opposite to the first frame-side clamp member, and pivotally mounted on the frame-side bracket.

The door-side docking unit may include a door-side bracket fixed to the vehicle door, a first door-side clamp member mounted on the door-side bracket in a manner that is biased toward a center of the door-side bracket by a first door-side biasing element, and a second door-side clamp member opposite to the first door-side clamp member, and mounted on the door-side bracket in a manner that is biased toward the center of the door-side bracket by a second door-side biasing element.

The frame-side docking unit may include a frame-side bracket fixed to the door frame, a first frame-side clamp member mounted on the frame-side bracket in a manner that is biased toward a center of the frame-side bracket by a first frame-side biasing element, and a second frame-side clamp member opposite to the first frame-side clamp member, and mounted on the frame-side bracket in a manner that is biased toward the center of the frame-side bracket by a second frame-side biasing element.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
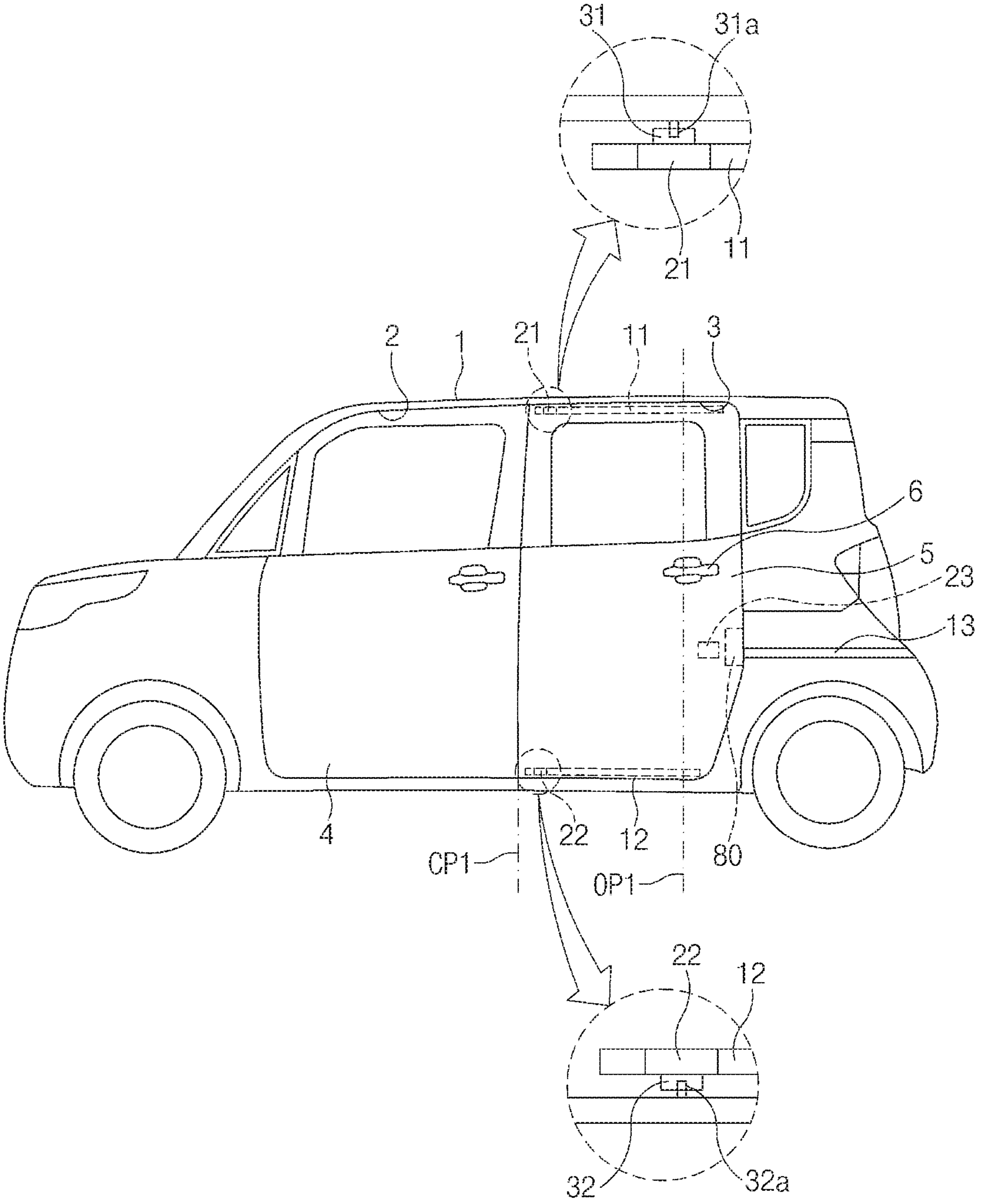
FIG. 1 illustrates a vehicle door opening and closing apparatus according to an exemplary embodiment of the present disclosure, which is mounted on a rear door of a vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

A vehicle door opening and closing apparatus, according to exemplary embodiments of the present disclosure, may allow a vehicle door to open and close selectively in either a sliding mode or a swing mode. In other words, the vehicle door opening and closing apparatus, according to exemplary embodiments of the present disclosure, may be a transform-type door opening and closing apparatus. The sliding mode may allow the vehicle door to open and close by sliding in a longitudinal direction of a vehicle, and the swing mode may allow the vehicle door to open and close by swinging inwards and outwards.

Referring to FIG. 1, a vehicle body 1 may have a plurality of door apertures 2 and 3, and the plurality of door apertures 2 and 3 may be divided into a front aperture 2 and a rear aperture 3. A plurality of vehicle doors 4 and 5 may include a front door 4 covering and uncovering the front aperture 2, and a rear door 5 covering and uncovering the rear aperture 3. As the front door 4 is opened, the front door 4 may uncover the front aperture 2, and as the front door 4 is closed, the front door 4 may cover the front aperture 2. As the rear door 5 is opened, the rear door 5 may uncover the rear aperture 3, and as the rear door 5 is closed, the rear door 5 may cover the rear aperture 3.

The vehicle door opening and closing apparatus, according to exemplary embodiments of the present disclosure, may be applied to the front door 4, the rear door 5, and the like. FIGS. 1 to 16 illustrate a vehicle door opening and closing apparatus according to exemplary embodiments of the present disclosure, which is applied to the rear door 5. Hereinafter, the rear door 5 will be referred to as the vehicle door 5, and the rear aperture 3 will be referred to as the door aperture 3.

The vehicle door opening and closing apparatus, according to exemplary embodiments of the present disclosure, may include one or more rails 11 and 12 mounted on the vehicle body 1, and the rails 11 and 12 may extend in the longitudinal direction of the vehicle. Referring to FIG. 1, an upper rail 11 may be mounted on an upper edge of the vehicle body 1, and a lower rail 12 may be mounted on a lower edge of the vehicle body 1. The upper rail 11 and the lower rail 12 may extend in the longitudinal direction of the vehicle. The upper rail 11 may be disposed on an upper edge of the door aperture 3, and the lower rail 12 may be disposed on a lower edge of the door aperture 3.

The vehicle door opening and closing apparatus, according to exemplary embodiments of the present disclosure, may include roller units 21 and 22 guided along the rails 11 and 12. The roller units 21 and 22 may allow the vehicle door 5 to open and close in one mode selected from the sliding mode and the swing mode. In particular, the roller units 21 and 22 may be releasably held in predetermined positions of the rails 11 and 12 by hold locks 31 and 32. Specifically, when the roller units 21 and 22 are held in the predetermined positions of the rails 11 and 12 by the hold locks 31 and 32, the vehicle door 5 may be opened and closed in the swing mode in which the vehicle door swings in the predetermined positions of the rails 11 and 12. When the roller units 21 and 22 are released by the hold locks 31 and 32, the vehicle door 5 may be opened and closed in the sliding mode in which the vehicle door slides along the rails 11 and 12.

Figure 3:
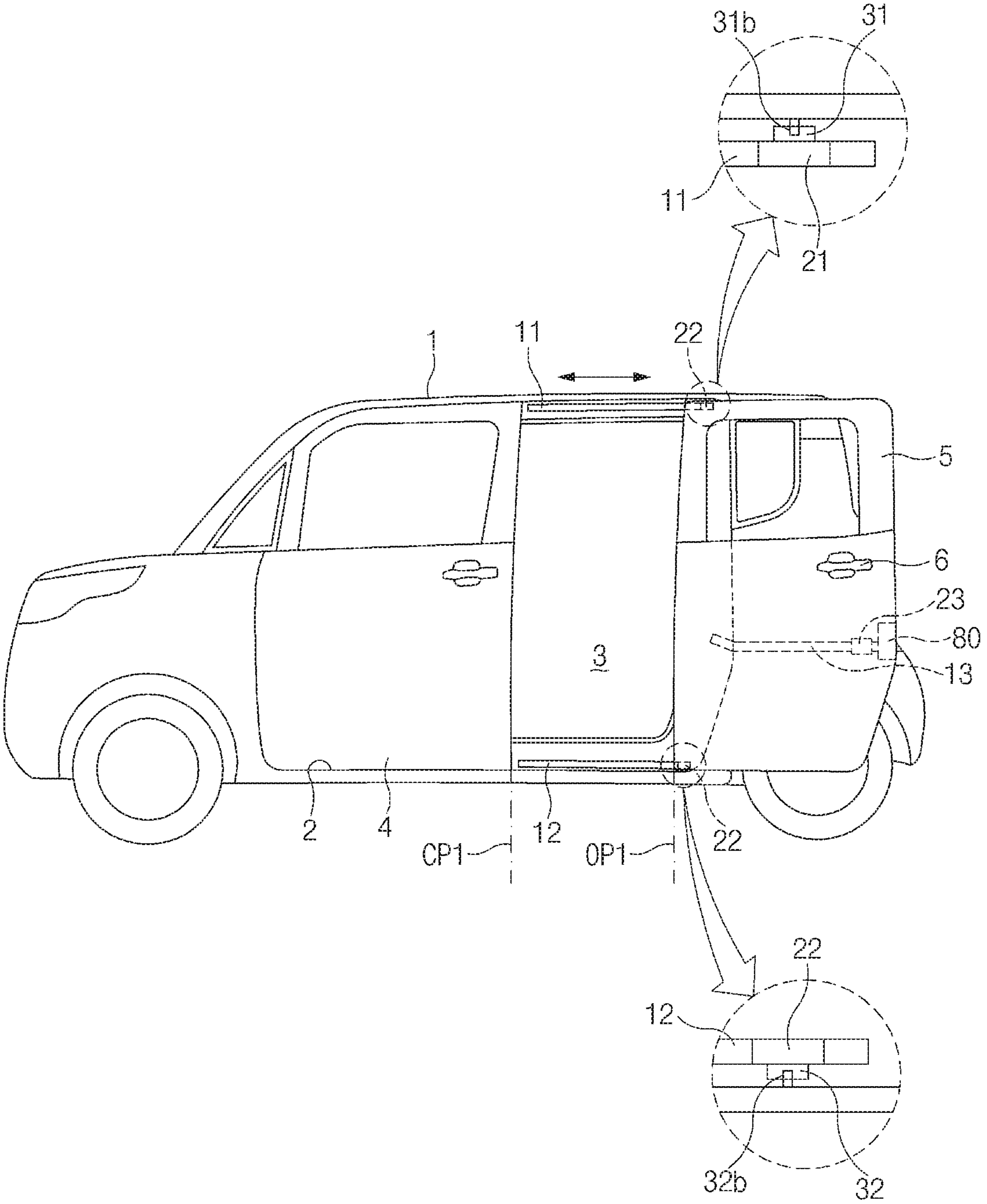
FIG. 3 illustrates a state in which the door of FIG. 1 is opened in a sliding mode.

Referring to FIGS. 1 and 3, an upper roller unit 21 may be mounted on an upper end of the vehicle door 5, and the upper roller unit 21 may slide along the upper rail 11. A lower roller unit 22 may be mounted on a lower end of the vehicle door 5, and the lower roller unit 22 may slide along the lower rail 12.

Figure 2:
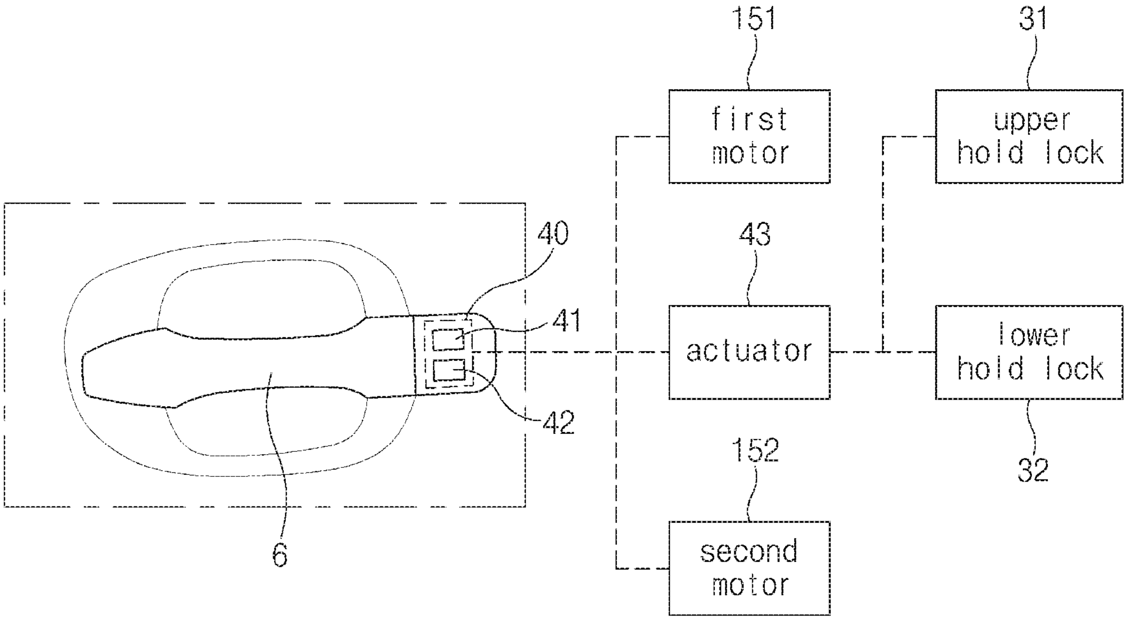
FIG. 2 illustrates a selector adjacent to an outside handle of a vehicle, an actuator and motors connected to the selector, and hold locks.

Referring to FIG. 2, the vehicle door 5 may include an outside handle 6, and a selector 40 for selecting the sliding mode and the swing mode may be adjacent to the outside handle 6. The selector 40 may have a first switch 41 selecting the sliding mode, and a second switch 42 selecting the swing mode.

When a user presses the first switch 41 and the sliding mode is selected, the vehicle door 5 may slide along the upper rail 11, the lower rail 12, and a center rail 13 as illustrated in FIG. 3 as the user pushes or pulls the outside handle 6 toward the front or rear of the vehicle. In the sliding mode, the vehicle door 5 may move between a first open position OP1 and a first closed position CP1, as illustrated in FIGS. 1 and 3. The first open position OP1 refers to a position in which the vehicle door 5 is fully opened, and the first closed position CP1 refers to a position in which the vehicle door 5 is fully closed.

Figure 4:
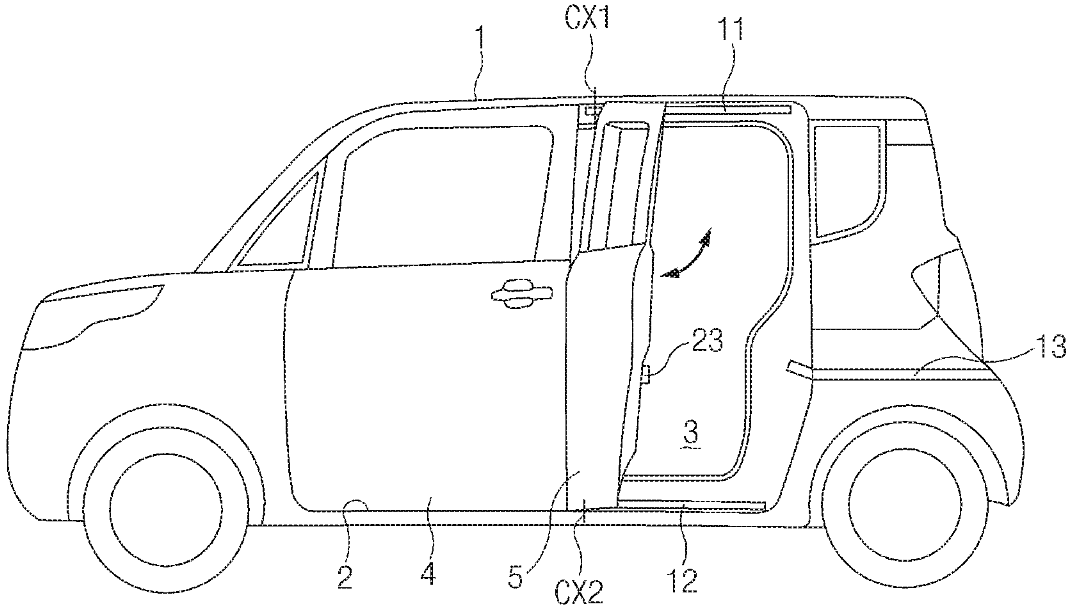
FIG. 4 illustrates a state in which the door of FIG. 1 is opened in a swing mode.
Figure 7:
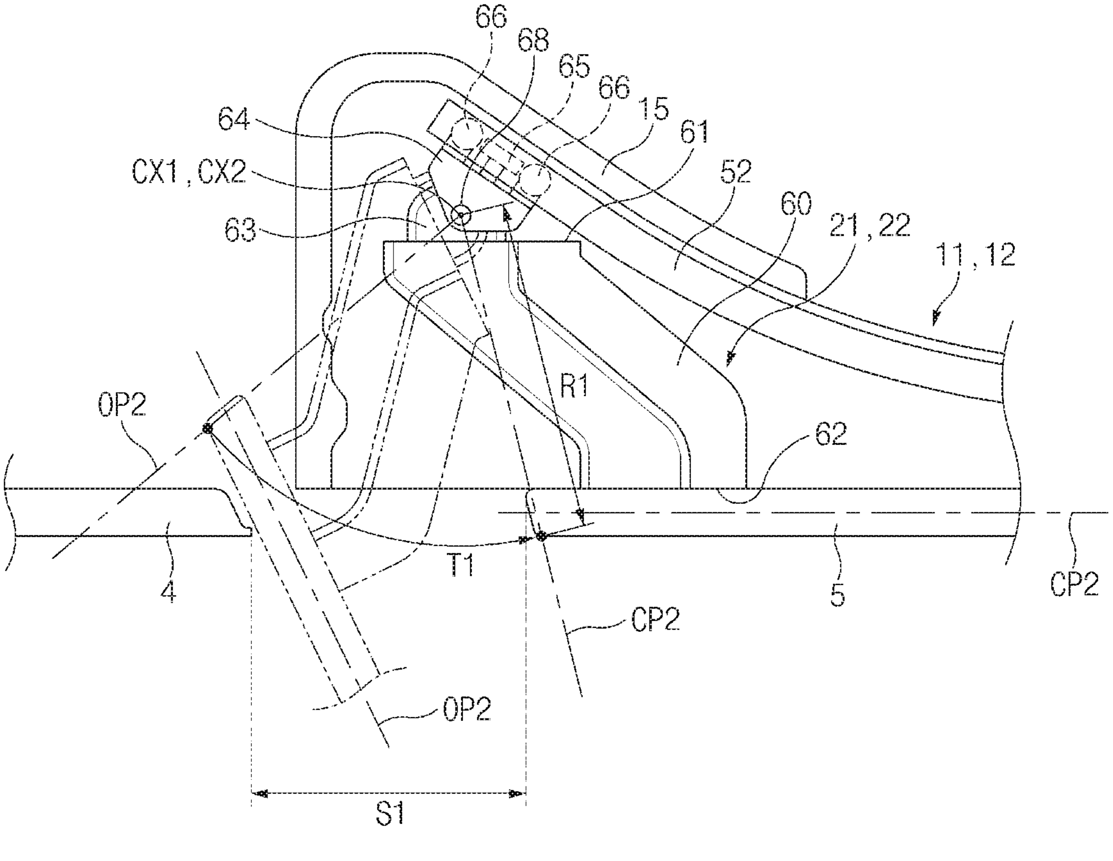
FIG. 7 illustrates an operation in which a vehicle door is opened and closed in a swing mode by an upper roller unit and a lower roller unit of a vehicle door opening and closing apparatus according to an exemplary embodiment of the present disclosure.
Figure 9:
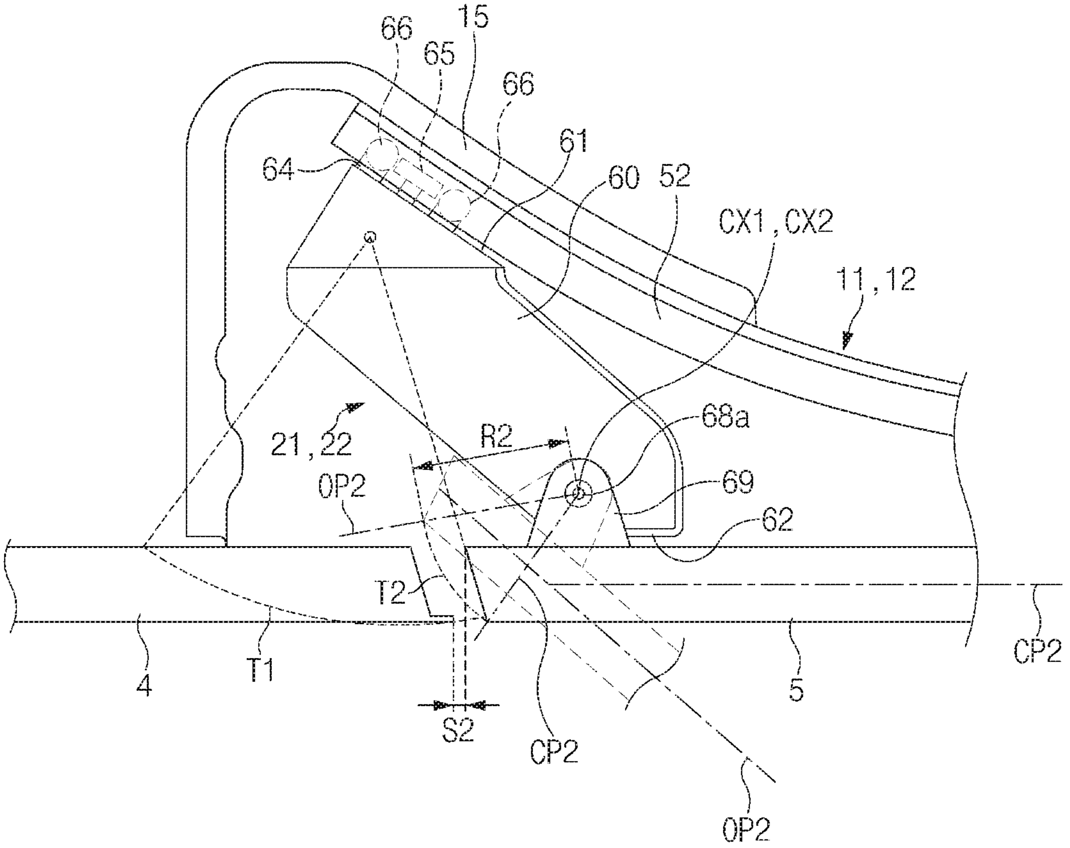
FIG. 9 illustrates an operation in which a vehicle door is opened and closed in a swing mode by an upper roller unit and a lower roller unit of a vehicle door opening and closing apparatus according to another exemplary embodiment of the present disclosure.

When the user presses the second switch 42 and the swing mode is selected, the vehicle door 5 may swing as illustrated in FIG. 4 as the user pushes or pulls the outside handle 6 toward a passenger compartment or the exterior side of the vehicle. In the swing mode, the vehicle door 5 may move between a second open position OP2 in which the vehicle door 5 is fully opened and a second closed position CP2 in which the vehicle door 5 is fully closed, as illustrated in FIGS. 7 and 9. In particular, when the vehicle door 5 is held in the first closed position CP1, it may be operated in the swing mode.

The upper roller unit 21 may have an upper hold lock 31, and the vehicle body 1 may have a first upper striker 31*a* and a second upper striker 31*b* protruding downwardly from a roof of the vehicle body 1. The first upper striker 31*a* may be aligned with or adjacent to a virtual axis of the first closed position CP1, and the second upper striker 31*b* may be aligned with or adjacent to a virtual axis of the first open position OP1.

According to an exemplary embodiment, as illustrated in FIGS. 1 and 3, the upper hold lock 31 may releasably hold the first upper striker 31*a* in the first closed position CP1, and releasably hold the second upper striker 31*b* in the first open position OP1. That is, one upper hold lock 31 may selectively hold the first upper striker 31*a* and the second upper striker 31*b*. As the upper hold lock 31 holds the first upper striker 31*a*, the upper roller unit 21 may be held in the first closed position CP1. As the upper hold lock 31 holds the second upper striker 31*b*, the upper roller unit 21 may be held in the first open position OP1.

According to another exemplary embodiment, the upper hold lock 31 may releasably hold the first upper striker 31*a* in the first closed position CP1, and a separate upper open hold lock (not shown) may releasably hold the second upper striker 31*b* in the first open position OP1. That is, the upper hold lock 31, which releasably holds the first upper striker 31*a* in the first closed position CP1, and the upper open hold lock, which releasably holds the second upper striker 31*b* in the first open position OP1, may be individually mounted on the upper roller unit 21.

Referring to FIGS. 4 and 9, the upper roller unit 21 may have an upper rotation axis CX1, and the vehicle door 5 may rotate around the upper rotation axis CX1. When the upper roller unit 21 is firmly held in the first closed position CP1 by the upper hold lock 31 and the first upper striker 31*a*, the vehicle door 5 may rotate around the upper rotation axis CX1.

The lower roller unit 22 may have a lower hold lock 32, and the vehicle body 1 may have a first lower striker 32*a* and a second lower striker 32*b* protruding upwardly from the bottom of the vehicle body 1. The first lower striker 32*a* may be aligned with or adjacent to the virtual axis of the first closed position CP1, and the second lower striker 32*b* may be aligned with or adjacent to the virtual axis of the first open position OP1.

According to an exemplary embodiment, as illustrated in FIGS. 1 and 3, the lower hold lock 32 may releasably hold the first lower striker 32*a* in the first closed position CP1, and releasably hold the second lower striker 32*b* in the first open position OP1. That is, one lower hold lock 32 may selectively hold the first lower striker 32*a* and the second lower striker 32*b*. As the lower hold lock 32 holds the first lower striker 32*a*, the lower roller unit 22 may be firmly held in the first closed position CP1. As the lower hold lock 32 holds the second lower striker 32*b*, the lower roller unit 22 may be firmly held in the first open position OP1.

According to another exemplary embodiment, the lower hold lock 32 may releasably hold the first lower striker 32*a* in the first closed position CP1, and a separate lower open hold lock (not shown) may releasably hold the second lower striker 32*b* in the first open position OP1. That is, the lower hold lock 32, which releasably holds the first lower striker 32*a* in the first closed position CP1, and the lower open hold lock, which releasably holds the second lower striker 32*b* in the first open position OP1, may be individually mounted on the lower roller unit 22.

Referring to FIGS. 4 and 9, the lower roller unit 22 may have a lower rotation axis CX2, and the vehicle door 5 may rotate around the lower rotation axis CX2. When the lower roller unit 22 is firmly held in the first closed position CP1 by the lower hold lock 32 and the first lower striker 32*a*, the vehicle door 5 may rotate around the lower rotation axis CX2.

As illustrated in FIG. 4, the upper rotation axis CX1 and the lower rotation axis CX2 may be vertically aligned, and the vehicle door 5 may rotate around the vertically aligned upper and lower rotation axes CX1 and CX2.

Referring to FIG. 2, the selector 40 may be electrically connected to an actuator 43, and the actuator 43 may be configured to operate the upper hold lock 31 and the lower hold lock 32.

As the user selects the selector 40, the actuator 43 may selectively perform a hold operation in which the upper hold lock 31 holds the first upper striker 31*a* and the lower hold lock 32 holds the first lower striker 32*a*, and a release operation in which the upper hold lock 31 releases the first upper striker 31*a* and the lower hold lock 32 releases the first lower striker 32*a*.

When the user presses the first switch 41 of the selector 40 in a state in which the vehicle door 5 is closed, the upper hold lock 31 may release the first upper striker 31*a* and the lower hold lock 32 may release the first lower striker 32*a* simultaneously by the release operation of the actuator 43. Thus, the user may slide the vehicle door 5 in the longitudinal direction of the vehicle body 1 so that the vehicle door 5 may be opened and closed in the sliding mode.

When the user presses the second switch 42 of the selector 40 in a state in which the vehicle door 5 is closed, the upper hold lock 31 may hold the first upper striker 31*a* and the lower hold lock 32 may hold the first lower striker 32*a* simultaneously by the hold operation of the actuator 43, and the upper roller unit 21 and the lower roller unit 22 may be firmly held in the first closed position CP1. Thus, the user may swing the vehicle door 5 toward the interior space or exterior of the vehicle so that the vehicle door 5 may be opened and closed in the swing mode.

According to an exemplary embodiment, as illustrated in FIG. 2, one actuator 43 may operate the upper hold lock 31 and the lower hold lock 32 simultaneously.

According to another exemplary embodiment, an actuator operating the upper hold lock 31 and another actuator operating the lower hold lock 32 may be individually connected to the selector 40.

FIGS. 10A to 10D illustrate the upper hold lock 31 and the lower hold lock 32 according to an exemplary embodiment of the present disclosure. Referring to FIGS. 10A to 10D, each of the upper hold lock 31 and the lower hold lock 32 may include a catch 71, a pawl 72 releasably engaging with the catch 71, and a lever 73 operatively connected to the pawl 72. The lever 73 may be connected to the actuator 43 through a cable 75. As the cable 75 is reversed (pulled) by the actuator 43, the catch 71 may release the strikers 31*a* and 32*a*. A portion of the catch 71, the pawl 72, and the lever 73 may be covered by a cover plate 76, and the cover plate 76 may be attached to a mounting plate 74. The strikers 31*a* and 32*a* may be fixed to the vehicle body 1 by a mounting plate 78.

Referring to FIGS. 10A to 10D, the upper hold lock 31 may releasably hold the first upper striker 31*a*, and the lower hold lock 32 may releasably hold the first lower striker 32*a*.

Figure 10A:
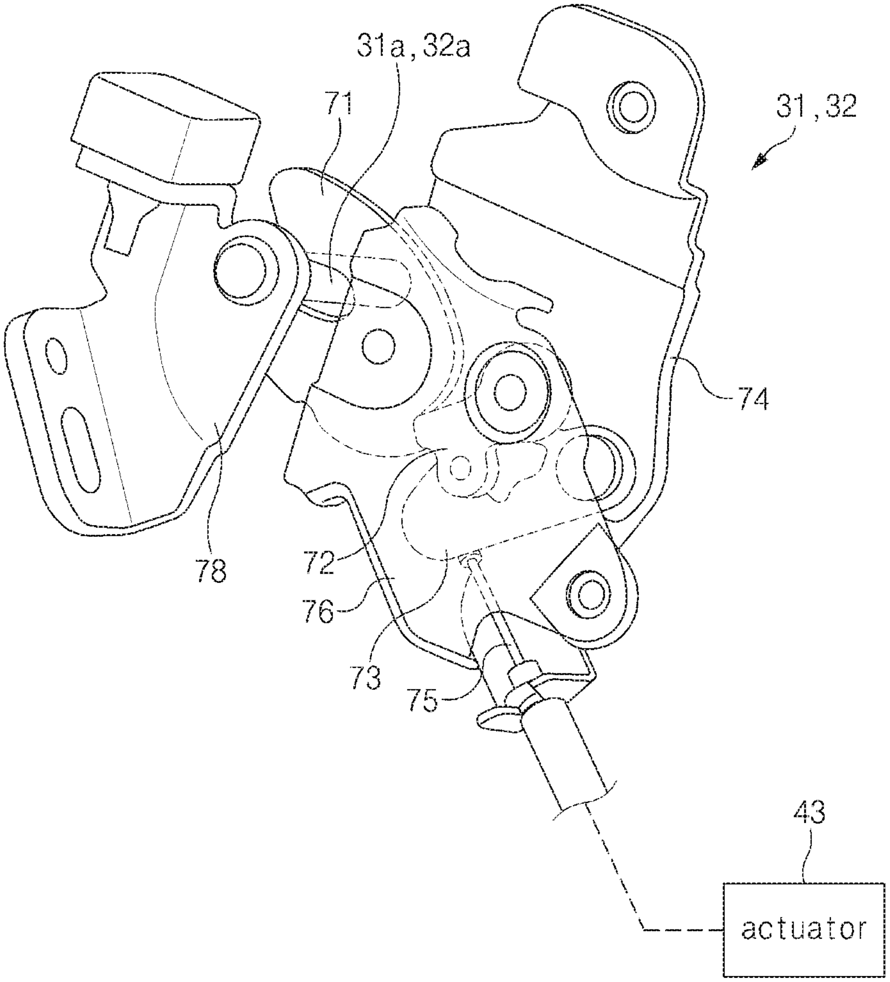
FIG. 10A illustrates a perspective view of an upper hold lock and a lower hold lock.
Figure 10B:
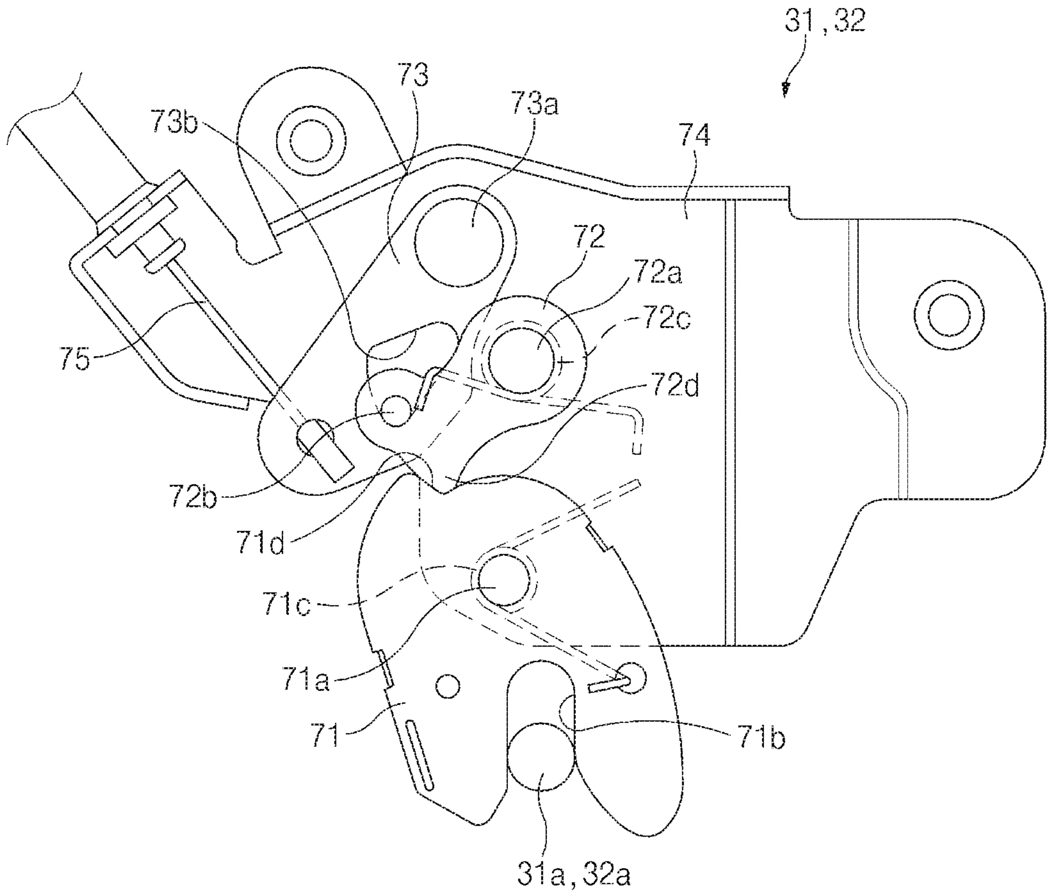
FIG. 10B illustrates a state in which an upper hold lock and a lower hold lock hold corresponding strikers.
Figure 10C:
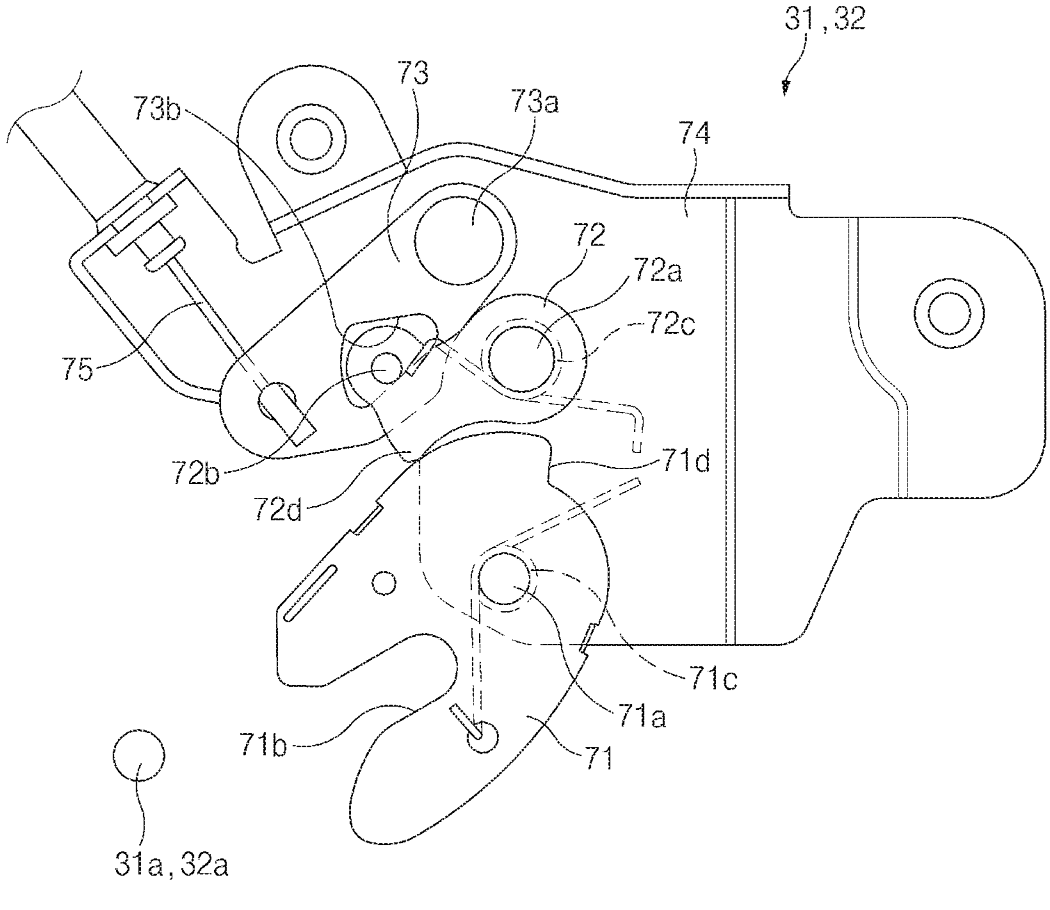
FIG. 10C illustrates a state in which an upper hold lock and a lower hold lock release corresponding strikers.

The catch 71 may be pivotally mounted on the mounting plate 74 through a first pivot shaft 71*a*. The catch 71 may have a slot 71*b* receiving the strikers 31*a* and 32*a*, and the catch 71 may engage with or release the strikers 31*a* and 32*a*. The catch 71 may move between an engaging position (see FIG. 10B) and a release position (see FIG. 10C). The engaging position refers to a position in which the catch 71 engages with the strikers 31*a* and 32*a* as illustrated in FIG. 10B, and the release position refers to a position in which the catch 71 releases the strikers 31*a* and 32*a* as illustrated in FIG. 10C. When the catch 71 is in the engaging position as illustrated in FIG. 10B, the catch 71 may engage with the strikers 31*a* and 32*a* so that the catch 71 may hold the strikers 31*a* and 32*a*. When the catch 71 is in the release position as illustrated in FIG. 10C, the catch 71 may release the strikers 31*a* and 32*a*. Thus, the strikers 31*a* and 32*a* may be released from the slot 71*b* of the catch 71 or be received in the slot 71*b* of the catch 71. The catch 71 may be biased toward the release position by a first biasing element 71*c* such as a torsion spring. The first biasing element 71*c* may be disposed around the first pivot shaft 71*a*. The catch 71 may have a locking shoulder 71*d*.

Figure 10D:
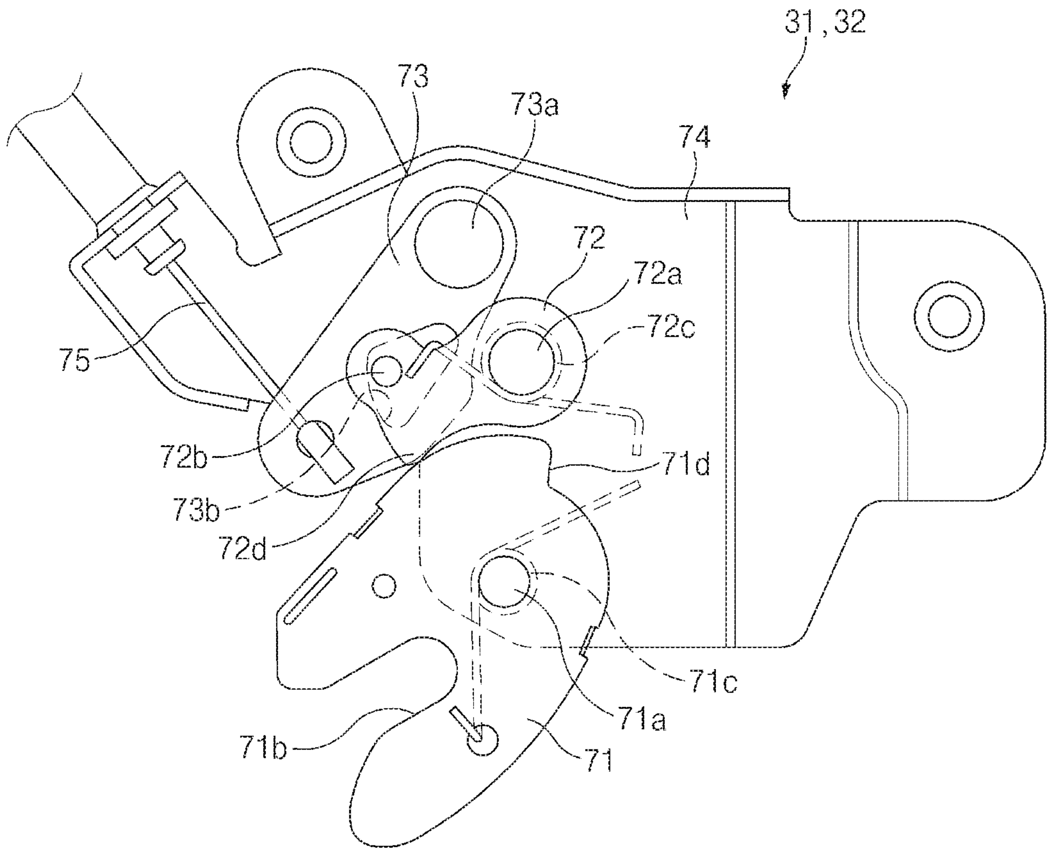
FIG. 10D illustrates a state in which an upper hold lock and a lower hold lock are allowed to receive corresponding strikers.

The pawl 72 may be pivotally mounted on the mounting plate 74 through a second pivot shaft 72*a*, and the pawl 72 may move between a pawl locking position (see FIG. 10B) and a pawl release position (see FIGS. 10C and 10D). The pawl locking position refers to a position in which the pawl 72 engages with the catch 71 and the catch 71 is kept in the engaging position, and the pawl release position refers to a position in which the pawl 72 releases the catch 71 and the catch 71 is allowed to move from the engaging position to the release position. As illustrated in FIG. 10B, when the pawl 72 is in the pawl locking position, the movement (rotation) of the catch 71 may be restricted by the pawl 72 so that the catch 71 may be kept in the engaging position. As illustrated in FIGS. 10C and 10D, when the pawl 72 is in the pawl release position, the movement (rotation) of the catch 71 may not be restricted by the pawl 72 so that the catch 71 may move from the engaging position to the release position. The pawl 72 may be biased toward the pawl locking position (see FIG. 10B) by a second biasing element 72*c* such as a torsion spring. The second biasing element 72*c* may be disposed around the second pivot shaft 72*a*.

The pawl 72 may have a locking projection 72*d* locked to the locking shoulder 71*d* of the catch 71. As illustrated in FIG. 10B, as the pawl 72 is moved to the pawl locking position by the second biasing element 72*c*, the locking projection 72*d* of the pawl 72 may be locked to the locking shoulder 71*d* of the catch 71 and the movement (rotation) of the catch 71 may be restricted, so that the catch 71 may be kept in the engaging position. As illustrated in FIG. 10C, as the pawl 72 is moved to the pawl release position by the lever 73, the locking projection 72*d* of the pawl 72 may be released from the locking shoulder 71*d* of the catch 71 and the movement (rotation) of the catch 71 may be allowed, so that the catch 71 may be moved to the release position by the first biasing element 71*c*.

The lever 73 may be pivotally mounted on the mounting plate 74 through a third pivot shaft 73*a*. The lever 73 may be connected to the actuator 43 through the cable 75. An end of the cable 75 may be fixed to the lever 73, and the cable 75 may be advanced or reversed by the actuator 43. As the actuator 43 moves the cable 75, the lever 73 may pivot around the third pivot shaft 73*a*. As the cable 75 is reversed, the lever 73 may move the pawl 72 to the pawl release position (see FIG. 10C).

The lever 73 may be operatively connected to the pawl 72 through a pin 72*b* and an opening 73*b*. The pin 72*b* may be provided on the pawl 72, and the opening 73*b* may be provided in the lever 73. The pin 72*b* may be movably received in the opening 73*b*. As the lever 73 pivots around the third pivot shaft 73*a*, the pin 72*b* may move in the opening 73*b*, allowing the pawl 72 to move.

As illustrated in FIG. 10B, when the cable 75 is advanced by the actuator 43, the locking projection 72*d* of the pawl 72 may be locked to the locking shoulder 71*d* of the catch 71 and the movement (rotation) of the catch 71 may be restricted so that the catch 71 may be kept in the engaging position. The strikers 31*a* and 32*a* may be held in the slot 71*b* of the catch 71. That is, the upper hold lock 31 and the lower hold lock 32 may hold the corresponding strikers 31*a* and 32*a*.

As illustrated in FIG. 10C, when the cable 75 is reversed by the actuator 43, the lever 73 may move the pawl 72 to the pawl release position. The locking projection 72*d* of the pawl 72 may be released from the locking shoulder 71*d* of the catch 71 and the movement (rotation) of the catch 71 may be allowed, so that the catch 71 may be moved to the release position by the first biasing element 71*c*, and the strikers 31*a* and 32*a* may be released from the slot 71*b* of the catch 71. Thus, the upper hold lock 31 and the lower hold lock 32 may release the corresponding strikers 31*a* and 32*a*, and the upper roller unit 21 and the lower roller unit 22 may slide along the upper rail 11 and the lower rail 12.

As illustrated in FIG. 10D, even though the cable 75 is advanced by the actuator 43 in a state in which the locking projection 72*d* of the pawl 72 is released from the locking shoulder 71*d* of the catch 71, the catch 71 may be kept in the release position by the first biasing element 71*c* so that the movement (rotation) of the catch 71 may be allowed. In this state, the strikers 31*a* and 32*a* may be allowed to be received in the slot 71*b* of the catch 71. That is, in a state in which the movement (rotation) of the catch 71 is allowed as the locking projection 72*d* of the pawl 72 is released from the locking shoulder 71*d* of the catch 71, when the upper roller unit 21 and the lower roller unit 22 slide between the first closed position CP1 and the first open position OP1, the strikers 31*a* and 32*a* may be allowed to be received in the slot 71*b* of the catch 71. When a force applied by the upper hold lock 31 and the lower hold lock 32 in a state in which the strikers 31*a* and 32*a* are received in the slot 71*b* of the catch 71 is greater than a spring force of the first biasing element 71*c*, the catch 71 may be moved to the engaging position. As illustrated in FIG. 10B, as the locking projection 72*d* of the pawl 72 is locked to the locking shoulder 71*d* of the catch 71, the catch 71 may hold the strikers 31*a* and 32*a*.

Figure 5:
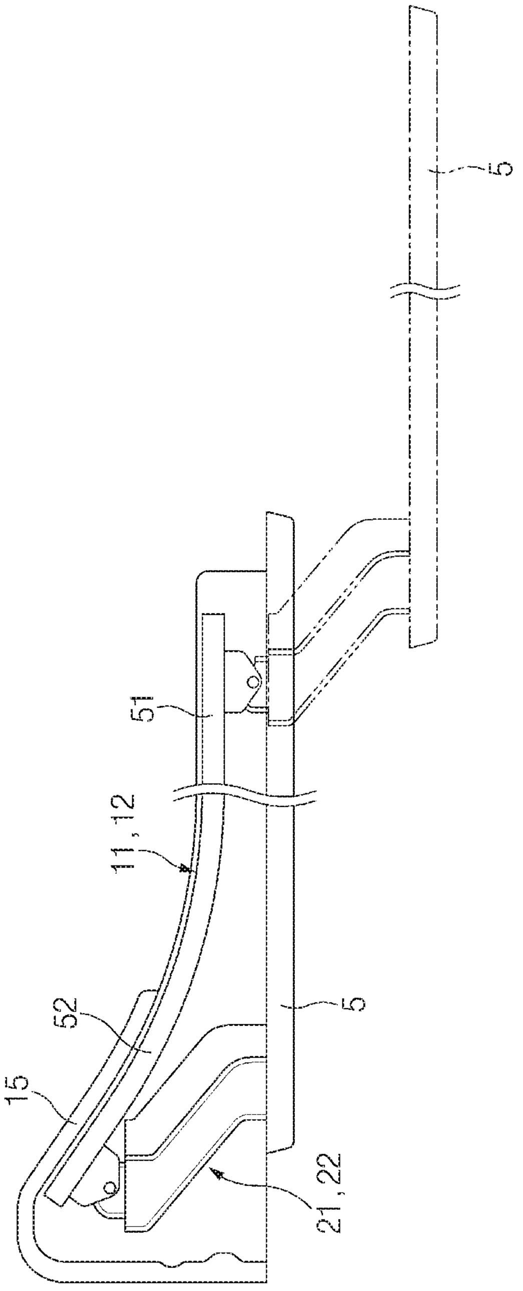
FIG. 5 illustrates an operation in which an upper roller unit and a lower roller unit move along an upper rail and a lower rail in a vehicle door opening and closing apparatus according to an exemplary embodiment of the present disclosure.

Referring to FIG. 5, each of the upper rail 11 and the lower rail 12 may be mounted on the vehicle body 1 through a mounting bracket 15, and the mounting bracket 15 may have a shape corresponding to that of the upper rail 11 and the lower rail 12. Each of the upper rail 11 and the lower rail 12 may have a first extension portion 51 extending straightly in the longitudinal direction of the vehicle, and a second extension portion 52 extending from the first extension portion 51 toward the interior space of the vehicle. The second extension portion 52 may be bent with respect to the first extension portion 51 at a predetermined angle.

Figure 6:
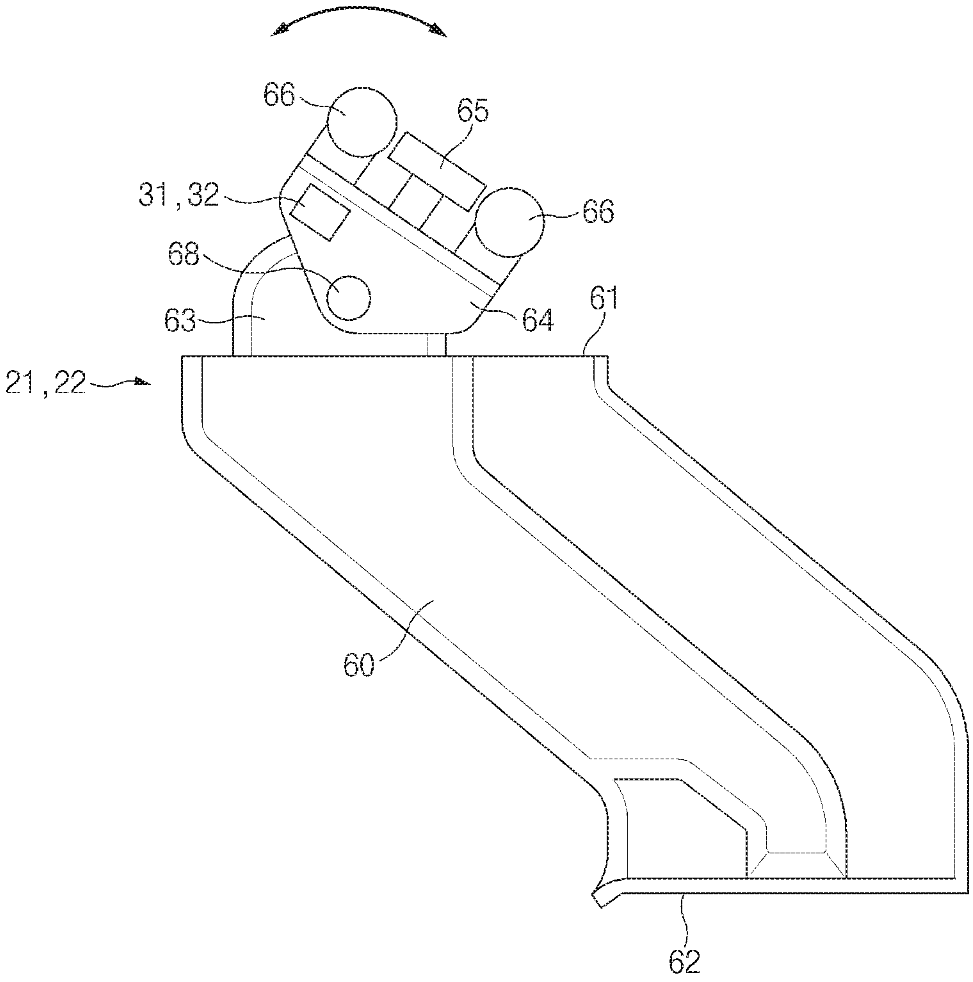
FIG. 6 illustrates an upper roller unit and a lower roller unit in a vehicle door opening and closing apparatus according to an exemplary embodiment of the present disclosure.

Referring to FIG. 6, each of the upper roller unit 21 and the lower roller unit 22 may include a roller bracket 64 having rollers 65 and 66 rolling along the rails 11 and 12, and a body 60 connecting the roller bracket 64 and the vehicle door 5.

The body 60 may extend diagonally so as not to contact the first extension portion 51 and the second extension portion 52. The body 60 may have a first end portion 61 facing the interior side of the vehicle, and a second end portion 62 facing the exterior side of the vehicle. The first end portion 61 of the body 60 may be attached to the roller bracket 64, and the second end portion 62 of the body 60 may be attached to the vehicle door 5.

The roller bracket 64 may rotatably support the rollers 65 and 66, and the rollers 65 and 66 may roll along the upper rail 11 and the lower rail 12. As illustrated in FIG. 6, a middle roller 65 and two side rollers 66 disposed on both sides of the middle roller 65 may be rotatably mounted on the roller bracket 64. A rotation axis of the middle roller 65 may be perpendicular to a rotation axis of the side roller 66.

According to an exemplary embodiment, as illustrated in FIG. 6, the first end portion 61 of the body 60 may be pivotally connected to the roller bracket 64 through a pivot pin 68, and the second end portion 62 of the body 60 may be fixed to the vehicle door 5. Thus, the vehicle door 5 may swing around the pivot pin 68 adjacent to the roller bracket 64. The body 60 may have a pivot lug 63 protruding from the first end portion 61 toward the roller bracket 64, and the roller bracket 64 may be connected to the pivot lug 63 through the pivot pin 68. The roller bracket 64 may be shaped so as not to interfere with the body 60 when the vehicle door 5 swings. The upper rotation axis CX1 and the lower rotation axis CX2 may be defined by the pivot pin 68. For example, the upper rotation axis CX1 and the lower rotation axis CX2 may be a virtual axis extending vertically along a center point of the pivot pin 68, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the roller bracket 64 of the upper roller unit 21, and the lower hold lock 32 may be fixed to the roller bracket 64 of the lower roller unit 22.

When, by the hold operation of the actuator 43, the upper hold lock 31 firmly holds the roller bracket 64 of the upper roller unit 21 in the first closed position CP1 and the lower hold lock 32 firmly holds the roller bracket 64 of the lower roller unit 22 in the first closed position CP1, the vehicle door 5 may swing around the upper rotation axis CX1 of the upper roller unit 21 and the lower rotation axis CX2 of the lower roller unit 22 as illustrated in FIG. 7. The vehicle door 5 may move between the second closed position CP2 in which the vehicle door 5 is closed and the second open position OP2 in which the vehicle door 5 is opened. When the vehicle door 5 swings, the other adjacent door 4 or other components may be spaced apart from the vehicle door 5 by a predetermined gap S1 so that any interference with the door 4 or the other components may be prevented. For example, the vehicle door 5 may be a rear door, and the other adjacent door 4 may be a front door.

According to the exemplary embodiment illustrated in FIGS. 6 and 7, as the pivot pin 68 is located between the roller bracket 64 and the first end portion 61 of the body 60, the rotation axes CX1 and CX2 of the vehicle door 5 may be relatively far from the vehicle door 5. Since a swing trajectory T1 and a rotation radius R1 of the vehicle door 5 are relatively increased, the gap S1 between the vehicle door 5 and the other adjacent door 4 may be relatively increased. If the gap S1 between the vehicle door 5 and the other adjacent door 4 is reduced, the vehicle door 5 may interfere with the adjacent door 4 when the vehicle door 5 moves toward the second open position OP2, and an open space created by the swing of the vehicle door 5 may be relatively narrowed since the swing trajectory T1 of the vehicle door 5 is relatively reduced.

Figure 8:
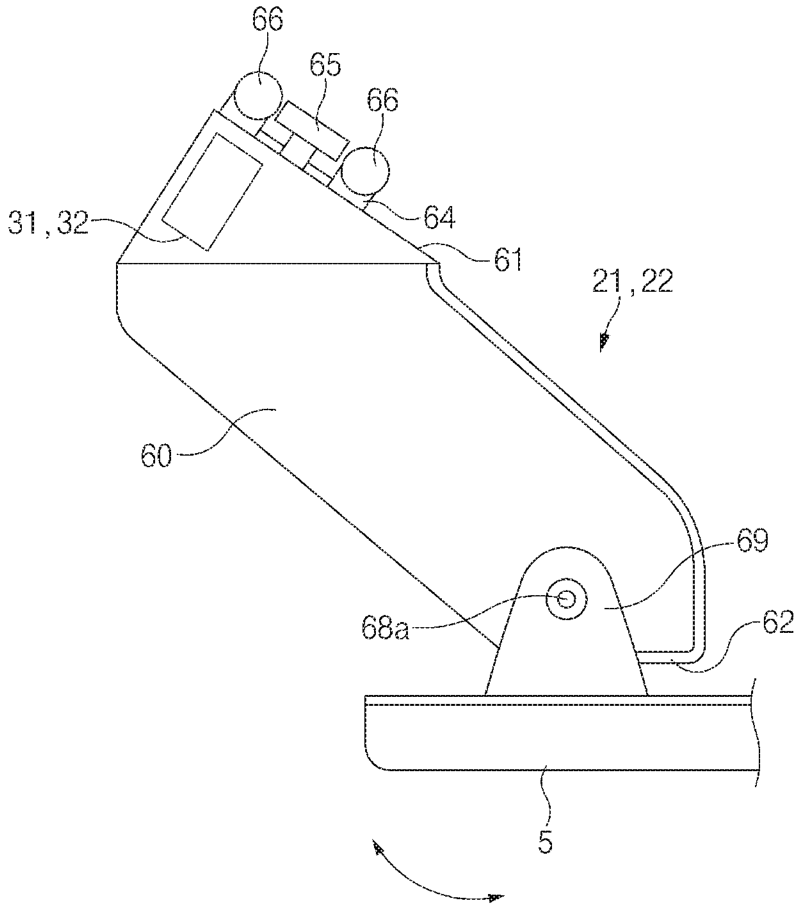
FIG. 8 illustrates an upper roller unit and a lower roller unit in a vehicle door opening and closing apparatus according to another exemplary embodiment of the present disclosure.

According to another exemplary embodiment, as illustrated in FIGS. 8 and 9, the first end portion 61 of the body 60 may be fixed to the roller bracket 64, and the second end portion 62 of the body 60 may be pivotally connected to the vehicle door 5 through a pivot pin 68*a*. Thus, the vehicle door 5 may swing around the pivot pin 68*a* adjacent to the second end portion 62 of the body 60.

Referring to FIGS. 8 and 9, the roller bracket 64 may be fixed to the first end portion 61 of the body 60 by welding, using fasteners, and/or the like, and the second end portion 62 of the body 60 may be pivotally connected to the vehicle door 5 through the pivot pin 68*a*. The vehicle door 5 may have a pivot lug 69 protruding toward the body 60, and the pivot lug 69 may be pivotally connected to the second end portion 62 of the body 60 through the pivot pin 68*a*. The second end portion 62 of the body 60 may be shaped so as not to interfere with the vehicle door 5 when the vehicle door 5 swings. The upper rotation axis CX1 and the lower rotation axis CX2 may be defined by the pivot pin 68*a*. For example, the upper rotation axis CX1 and the lower rotation axis CX2 may be a virtual axis extending vertically along a center point of the pivot pin 68*a*, and the upper rotation axis CX1 and the lower rotation axis CX2 may be vertically aligned, so that the vehicle door 5 may swing around the vertical rotation axis that virtually connects the upper rotation axis CX1 and the lower rotation axis CX2. The upper hold lock 31 may be fixed to the body 60 of the upper roller unit 21, and the lower hold lock 32 may be fixed to the body 60 of the lower roller unit 22.

Referring to FIG. 9, when the upper hold lock 31 firmly holds the roller bracket 64 of the upper roller unit 21 in the first closed position CP1, and the lower hold lock 32 firmly holds the roller bracket 64 of the lower roller unit 22 in the first closed position CP1, the vehicle door 5 may swing around the upper rotation axis CX1 of the upper roller unit 21 and the lower rotation axis CX2 of the lower roller unit 22. Thus, the vehicle door 5 may move between the second closed position CP2 in which the vehicle door 5 is closed and the second open position OP2 in which the vehicle door 5 is opened.

According to the exemplary embodiment illustrated in FIGS. 8 and 9, as the pivot pin 68*a* is located between the second end portion 62 of the body 60 and the vehicle door 5, the rotation axes CX1 and CX2 of the vehicle door 5 may be relatively close to the vehicle door 5. Since a rotation radius R2 of the vehicle door 5 is relatively shortened, a gap S2 between the vehicle door 5 and the other adjacent door 4 may be relatively reduced, resulting in improved exterior styling. Even though the rotation axes CX1 and CX2 of the vehicle door 5 are close to the vehicle door 5, a swing trajectory T2 of the vehicle door 5 is not reduced, and thus an open space created by the swing of the vehicle door 5 may not be narrowed.

Figure 11:
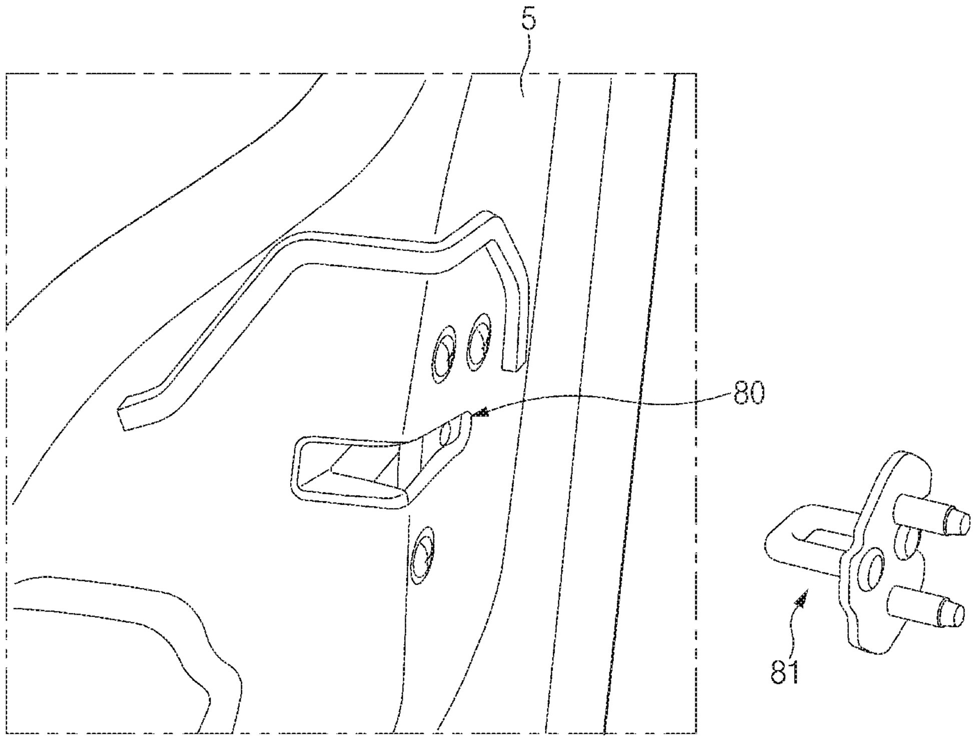
FIG. 11 illustrates a main latch mounted on a vehicle door and a main striker.

Referring to FIG. 11, a main latch 80 may be mounted on a rear end of the vehicle door 5, and a main striker 81 may be fixed to the vehicle body 1. The main latch 80 may releasably engage with the main striker 81. When the vehicle door 5 is in the first closed position CP1 or the second closed position CP2, the main latch 80 may engage with the main striker 81 by an engaging operation of the outside handle 6 so that the vehicle door 5 may be locked in the first closed position CP1 or the second closed position CP2. When the vehicle door 5 is in the first closed position CP1 or the second closed position CP2, the main latch 80 may release the main striker 81 by a release operation of the outside handle 6 so that the vehicle door 5 may be allowed to move in the sliding mode or the swing mode. When the vehicle door 5 is held in the first closed position CP1 and the main latch 80 releases the main striker 81, a center roller unit 23 may be released from the center rail 13, and thus the vehicle door 5 may be opened and closed in the swing mode.

The vehicle door opening and closing apparatus, according to exemplary embodiments of the present disclosure, may further include the center rail 13 mounted at a central portion of the vehicle body 1, and the center roller unit 23 guided along the center rail 13.

Referring to FIGS. 1 and 3, the center rail 13 may extend from a rear edge of the door aperture 3 in the longitudinal direction of the vehicle. The center roller unit 23 may be pivotally mounted at a central portion of the vehicle door 5. In particular, the center roller unit 23 may be mounted in a position adjacent to the rear end of the vehicle door 5. The center roller unit 23 may be guided along the center rail 13.

Figure 12:
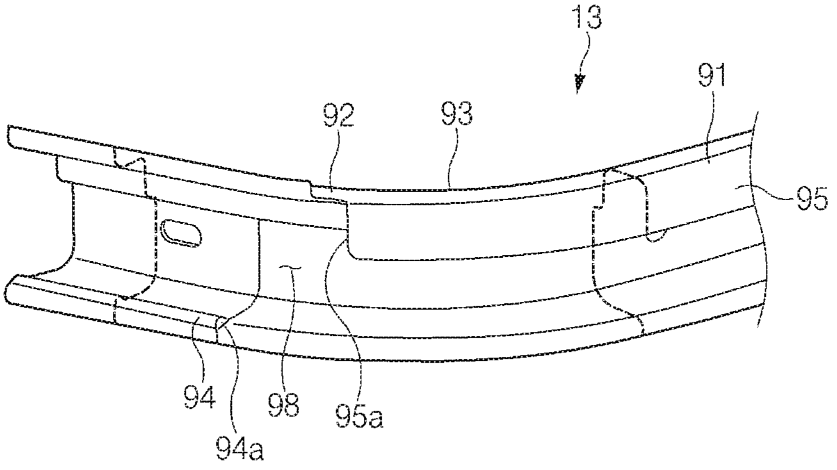
FIG. 12 illustrates a perspective view of a center rail in a vehicle door opening and closing apparatus according to an exemplary embodiment of the present disclosure.

Referring to FIG. 12, the center rail 13 may include a sliding guide 91 extending straightly in the longitudinal direction of the vehicle, and a swing guide 92 extending from the sliding guide 91 toward the interior side of the vehicle. The swing guide 92 may be bent at a predetermined angle with respect to the sliding guide 91 through a bending portion 93, and the bending portion 93 may be curved at a predetermined radius.

Figure 13:
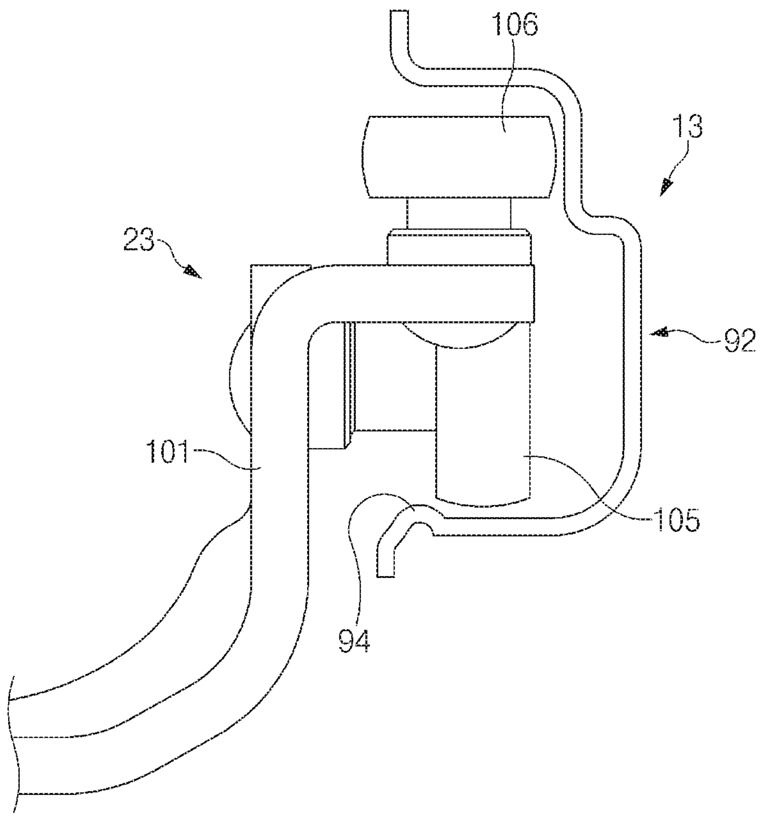
FIG. 13 illustrates a cross-sectional view of a swing guide of a center rail.
Figure 14:
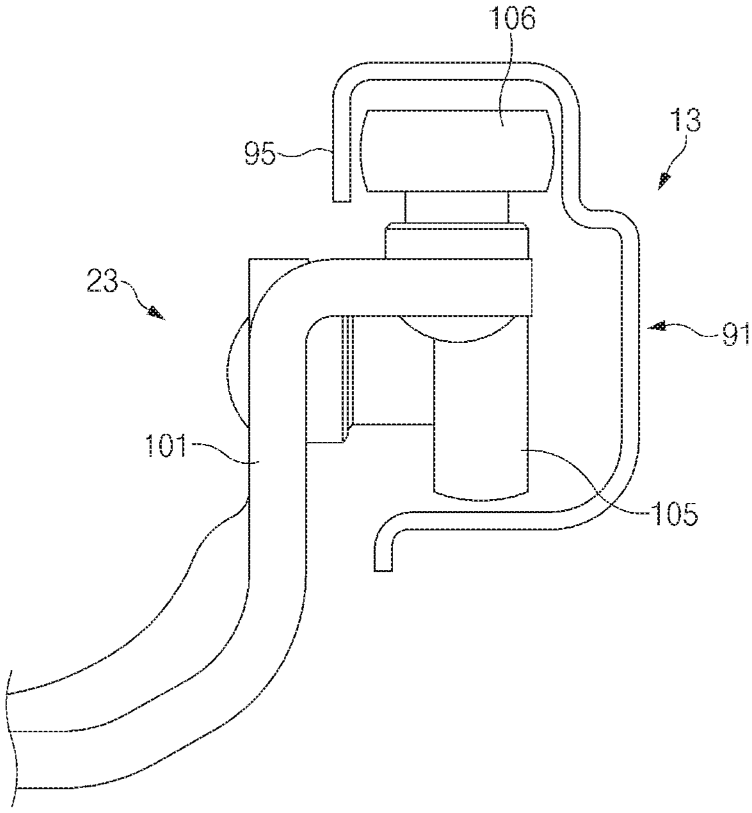
FIG. 14 illustrates a cross-sectional view of a sliding guide of a center rail.
Figure 15:
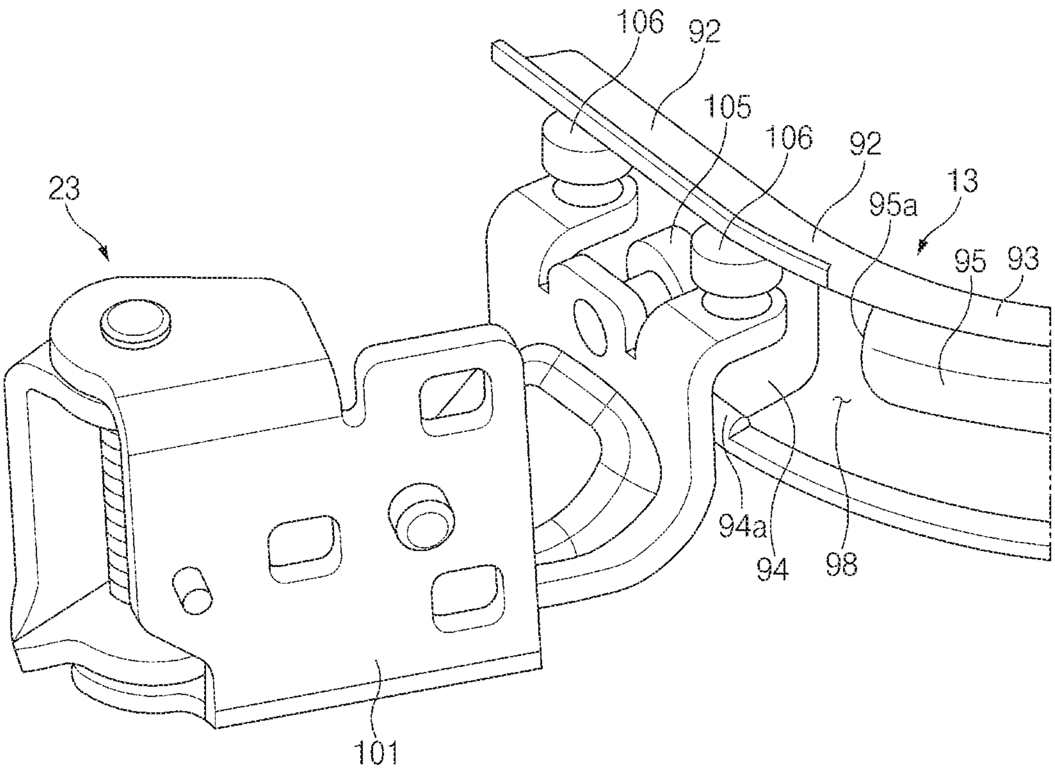
FIG. 15 illustrates a structure in which a center roller unit is held in a swing guide of a center rail.

Referring to FIGS. 13 to 15, the center roller unit 23 may include a roller bracket 101 and rollers 105 and 106 rotatably mounted on the roller bracket 101. The roller bracket 101 may be pivotally mounted at the central portion of the vehicle door 5. The rollers 105 and 106 may roll along the center rail 13. As illustrated in FIG. 15, a middle roller 105 and two side rollers 106 disposed on both sides of the middle roller 105 may be rotatably mounted on the roller bracket 101. A rotation axis of the middle roller 10 may be perpendicular to a rotation axis of the side roller 106.

When the vehicle door 5 slides in the longitudinal direction of the vehicle as the sliding mode is selected, the sliding guide 91 may guide the rollers 105 and 106 of the center roller unit 23.

Referring to FIGS. 12 and 14, the sliding guide 91 may include a stopper wall 95 preventing the rollers 105 and 106 of the center roller unit 23 from being separated from the sliding guide 91. The stopper wall 95 may extend along a length of the sliding guide 91 and a length of the bending portion 93. The stopper wall 95 may protrude vertically downward from the top of the sliding guide 91. As the stopper wall 95 closes an upper area of the sliding guide 91 and an upper area of the bending portion 93, the rollers 105 and 106 of the center roller unit 23 may be prevented from moving away from the sliding guide 91 toward the exterior side of the vehicle as illustrated in FIG. 14.

When the vehicle door 5 is opened and closed in the swing mode as the swing mode is selected, the swing guide 92 may guide the rollers 105 and 106 of the center roller unit 23 to be released from the center rail 13.

An exterior side of the swing guide 92 may be entirely opened toward the exterior of the vehicle. A guide projection 94 may protrude upwardly from the bottom of the swing guide 92, and the guide projection 94 may extend along a length of the swing guide 92. When the vehicle door 5 swings from the second closed position CP2 to the second open position OP2 along the swing trajectory T1 or T2, the middle roller 105 of the center roller unit 23 may be guided along the guide projection 94 as illustrated in FIG. 13.

Figure 16:
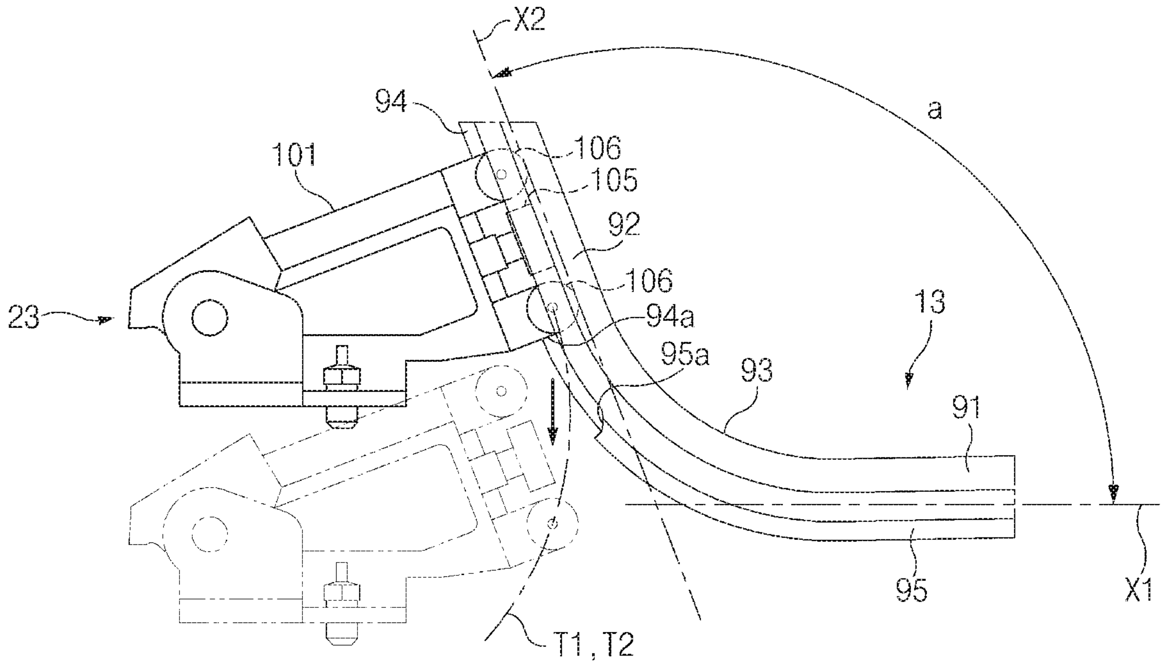
FIG. 16 illustrates an operation in which a center roller unit is released from a swing guide of a center rail.

A front end 95*a* of the stopper wall 95 of the sliding guide 91 and a rear end 94*a* of the guide projection 94 may be located so as not to interfere with the swing trajectories T1 and T2 of the vehicle door 5. In addition, as illustrated in FIG. 16, an axis X1 of the sliding guide 91 and an axis X2 of the swing guide 92 may intersect at a predetermined angle a. In particular, the angle a of intersection between the axis X1 of the sliding guide 91 and the axis X2 of the swing guide 92 may be an obtuse angle, so that the rollers 105 and 106 of the center roller unit 23 may easily be released from the swing guide 92 of the center rail 13 or may easily be received in the swing guide 92 of the center rail 13. The center rail 13 may include a space 98 allowing the rollers 105 and 106 of the center roller unit 23 to be released from the center rail 13 or be received in the center rail 13 when the vehicle door 5 swings in the swing mode. The space 98 may be defined between the front end 95*a* of the stopper wall 95 and the rear end 94*a* of the guide projection 94 as the front end 95*a* of the stopper wall 95 and the rear end 94*a* of the guide projection 94 are spaced apart from each other. Due to the space 98, there is no interference when the rollers 105 and 106 of the center roller unit 23 are released from the center rail 13 or are received in the center rail 13 in the swing mode.

Meanwhile, according to the exemplary embodiment illustrated in FIGS. 12 to 16, when malfunction of the main latch 80 or deformation of the vehicle door 5 or the swing guide 92 due to an external impact occurs in the sliding mode, the rollers 105 and 106 of the center roller unit 23 may be separated from the center rail 13, and thus the vehicle door 5 may fail to be easily opened and closed in the sliding mode.

Figure 17:
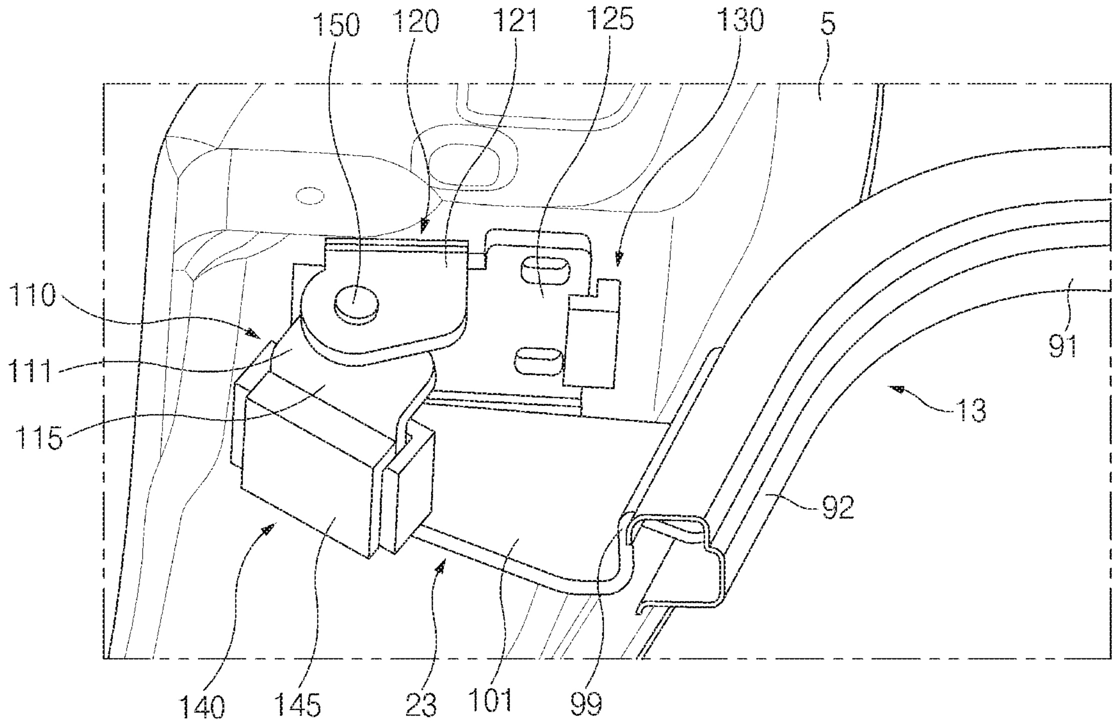
FIG. 17 illustrates a center roller unit, a door-side docking unit, and a frame-side docking unit in a vehicle door opening and closing apparatus according to an exemplary embodiment of the present disclosure.

In order to deal with this problem, the vehicle door opening and closing apparatus, according to exemplary embodiments of the present disclosure, may include a door-side docking unit 130 releasably connecting the center roller unit 23 to the vehicle door 5, and a frame-side docking unit 140 releasably connecting the center roller unit 23 to a door frame 3*a* of the vehicle body as illustrated in FIG. 17. Accordingly, the rollers 105 and 106 of the center roller unit 23 may not be separated from the center rail 13 in any mode of the swing mode and the sliding mode, and the center roller unit 23 may be releasably connected to the vehicle door 5 and the door frame 3*a* of the vehicle body as either the swing mode or the sliding mode is selected, and thus the vehicle door opening and closing apparatus may reliably open and close the vehicle door 5 in either the swing mode or the sliding mode. Here, the door frame 3*a* refers to a frame area of the vehicle body defining the door aperture 3.

Figure 32:
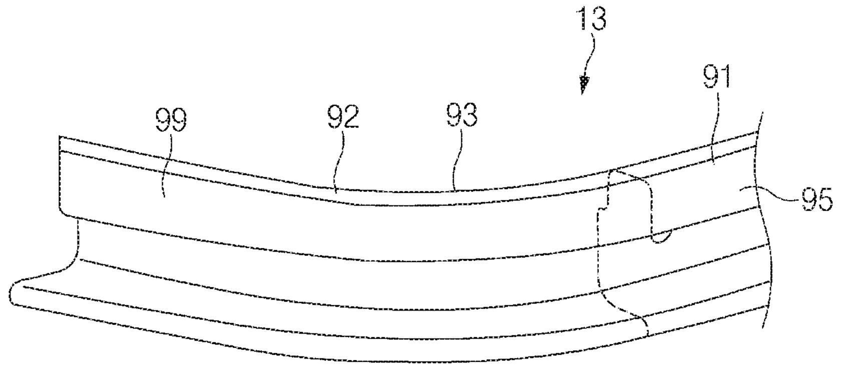
FIG. 32 illustrates a perspective view of a center rail in a vehicle door opening and closing apparatus according to another exemplary embodiment of the present disclosure.

Referring to FIG. 32, according to another exemplary embodiment, the swing guide 92 of the center rail 13 may have a stopper wall 99 extending from the stopper wall 95 of the sliding guide 91, and the swing guide 92 may use the stopper wall 99 to prevent the rollers 105 and 106 of the center roller unit 23 from being separated from the center rail 13. Thus, the rollers 105 and 106 of the center roller unit 23 may not be separated from the center rail 13 in any mode of the swing mode and the sliding mode.

The center roller unit 23 may include a roller-side hinge element 110 connected to the roller bracket 101 of the center roller unit 23, and a door-side hinge element 120 rotatably connected to the roller-side hinge element 110 through a hinge pin 150.

The roller-side hinge element 110 may be integrally connected to the roller bracket 101 of the center roller unit 23. In particular, the roller-side hinge element 110 may be integrally formed with the roller bracket 101 so that the roller-side hinge element 110 and the roller bracket 101 may form a unitary one-piece structure. The roller-side hinge element 110 may include a roller-side base 115 integrally connected to the roller bracket 101 of the center roller unit 23, and a pair of roller-side hinge arms 111 extending from the roller-side base 115. The roller-side hinge element 110 may be releasably connected to the door frame 3*a* by the frame-side docking unit 140.

The door-side hinge element 120 may include a door-side base 125 and a pair of door-side hinge arms 121 extending from the door-side base 125. The door-side hinge arms 121 may be rotatably connected to the roller-side hinge arms 111 through the hinge pin 150. The door-side hinge element 120 may be releasably connected to the vehicle door 5 by the door-side docking unit 130.

Figure 18:
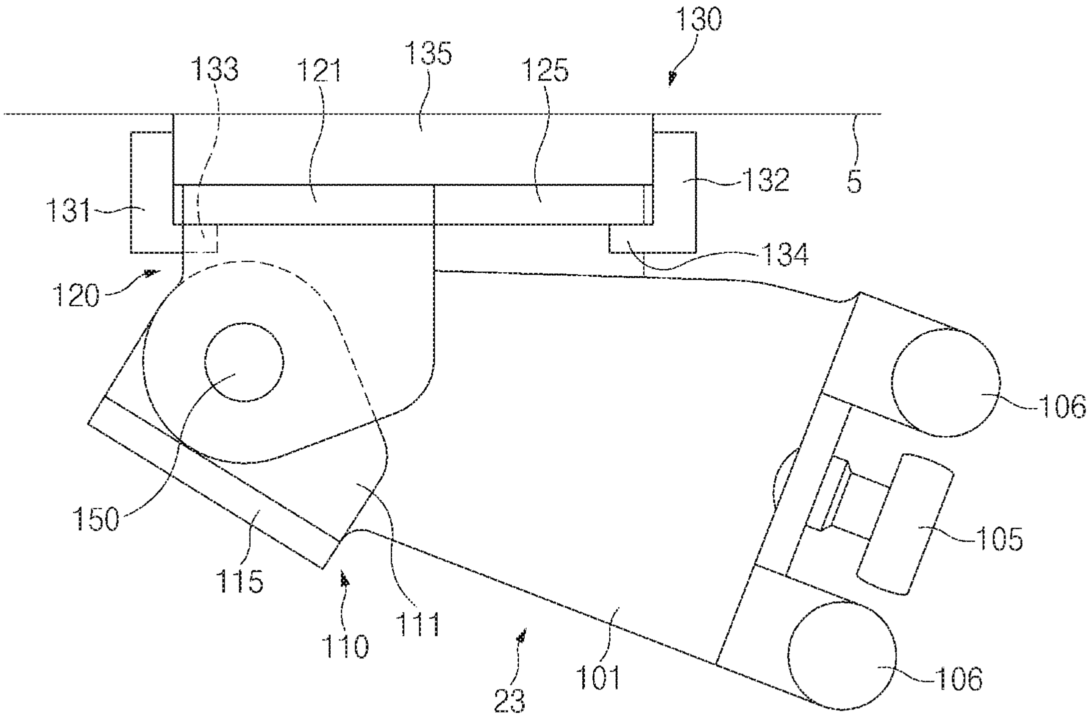
FIG. 18 illustrates a state in which a door-side hinge element of a center roller unit is connected to a door-side docking unit in a vehicle door opening and closing apparatus according to an exemplary embodiment of the present disclosure.
Figure 19:
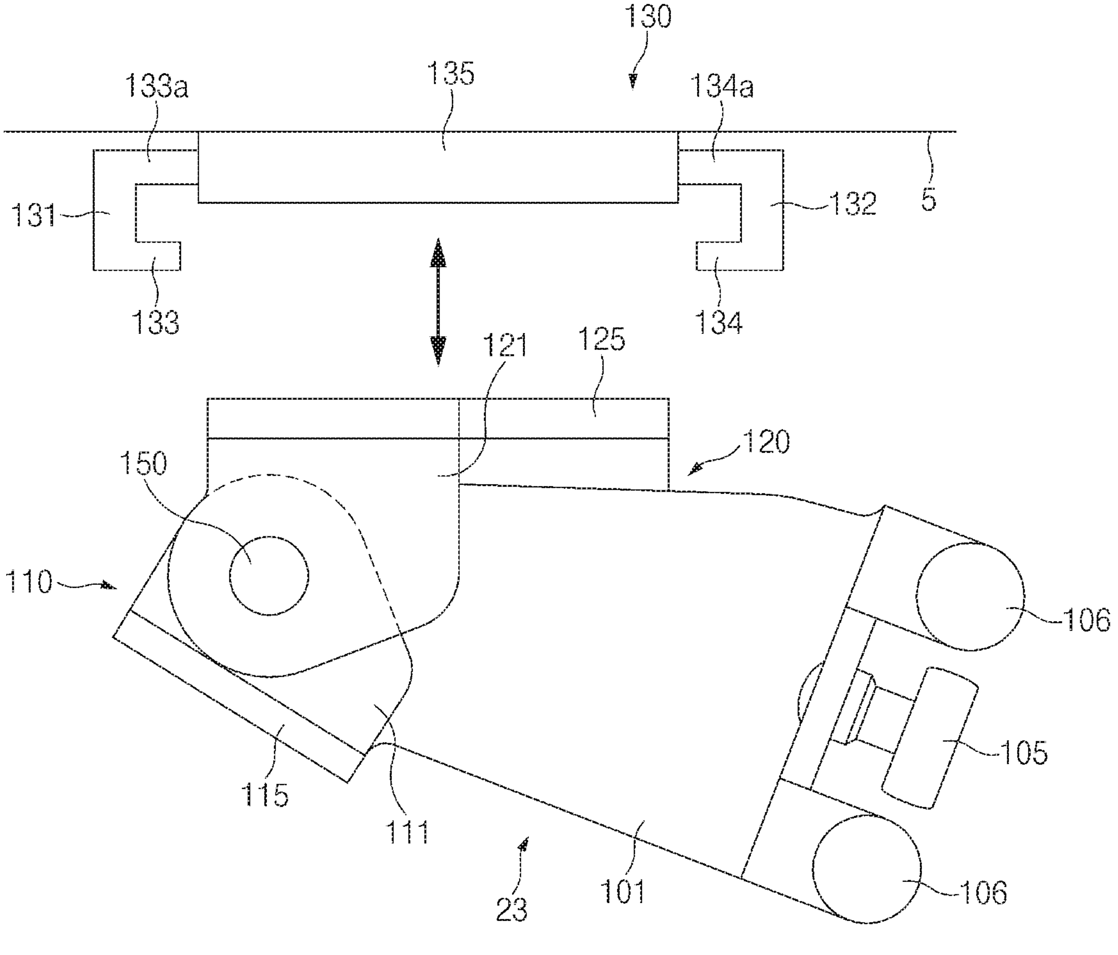
FIG. 19 illustrates a state in which a door-side hinge element of a center roller unit is released from a door-side docking unit in a vehicle door opening and closing apparatus according to an exemplary embodiment of the present disclosure.
Figure 20:
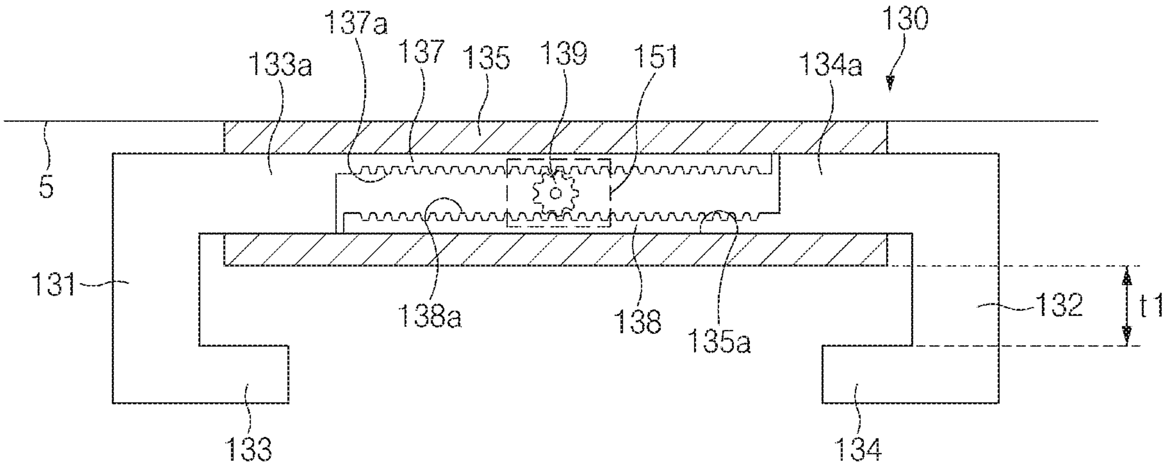
FIG. 20 illustrates a cross-sectional view of a door-side docking unit according to an exemplary embodiment of the present disclosure.

Referring to FIGS. 18 to 20, according to an exemplary embodiment, the door-side docking unit 130 may include a door-side bracket 135 and first and second door-side clamp members 131 and 132 which are movable in a direction approaching or moving away from the door-side bracket 135. The first door-side clamp member 131 and the second door-side clamp member 132 may move opposite to each other with respect to the door-side bracket 135 so that they may symmetrically clamp or release both edges of the door-side base 125 of the door-side hinge element 120.

The door-side bracket 135 may be fixed to the vehicle door 5 by welding, using fasteners, and/or the like. The door-side bracket 135 may have a door-side cavity 135*a*.

The first door-side clamp member 131 may be slidably mounted on the door-side bracket 135. The first door-side clamp member 131 may include a first door-side grip portion 133 and a first door-side extension portion 133*a* extending toward the second door-side clamp member 132. The first door-side grip portion 133 and the first door-side extension portion 133*a* may be spaced apart from each other.

The first door-side grip portion 133 may releasably clamp the door-side base 125 of the door-side hinge element 120. In particular, the first door-side grip portion 133 may have a shape corresponding to that of one edge of the door-side base 125. One surface of the door-side bracket 135 may be fixed to the vehicle door 5 by welding, using fasteners, and/or the like. The first door-side grip portion 133 may be spaced apart from the other surface of the door-side bracket 135 by a predetermined gap t1. The gap t1 between the other surface of the door-side bracket 135 and a surface of the first door-side grip portion 133 facing the door-side bracket 135 may correspond to a thickness of the door-side base 125, and thus the door-side base 125 may be firmly clamped by the door-side bracket 135 and the first door-side grip portion 133.

The first door-side extension portion 133*a* may be movably received in the door-side cavity 135*a* of the door-side bracket 135. A first door-side rack portion 137 may extend from the first door-side extension portion 133*a* toward the second door-side clamp member 132, and the first door-side rack portion 137 may have first door-side rack teeth 137*a* arranged in a longitudinal direction of the first door-side rack portion 137.

As illustrated in FIG. 18, as the first door-side clamp member 131 moves to approach the door-side bracket 135, the first door-side grip portion 133 may clamp one edge of the door-side base 125 of the door-side hinge element 120. As illustrated in FIG. 19, as the first door-side clamp member 131 moves away from the door-side bracket 135, the first door-side grip portion 133 may release one edge of the door-side base 125 of the door-side hinge element 120.

The second door-side clamp member 132 may be slidably mounted on the door-side bracket 135. The second door-side clamp member 132 may include a second door-side grip portion 134 and a second door-side extension portion 134*a* extending toward the first door-side clamp member 131. The second door-side grip portion 134 and the second door-side extension portion 134*a* may be spaced apart from each other.

The second door-side grip portion 134 may releasably clamp the door-side base 125 of the door-side hinge element 120. In particular, the second door-side grip portion 134 may have a shape corresponding to that of the other edge of the door-side base 125. The second door-side grip portion 134 may be spaced apart from the other surface of the door-side bracket 35 by the predetermined gap t1. The gap t1 between the other surface of the door-side bracket 135 and a surface of the second door-side grip portion 134 facing the door-side bracket 135 may correspond to the thickness of the door-side base 125, and thus the door-side base 125 may be firmly clamped by the door-side bracket 135 and the second door-side grip portion 134.

The second door-side extension portion 134*a* may be movably received in the door-side cavity 135*a* of the door-side bracket 135. A second door-side rack portion 138 may extend from the second door-side extension portion 134*a* toward the first door-side clamp member 131. The second door-side rack portion 138 may have second door-side rack teeth 138*a* arranged in a longitudinal direction of the second door-side rack portion 138.

A door-side pinion 139 may be disposed between the first door-side rack portion 137 and the second door-side rack portion 138. The door-side pinion 139 may mesh with the first door-side rack teeth 137*a* and the second door-side rack teeth 138*a*.

The door-side pinion 139 may engage with a driving shaft of a first driving motor 151, and the first driving motor 151 may be a bidirectional motor rotatable in both directions. The door-side pinion 139 may be rotatable in both directions by the first driving motor 151.

Referring to FIG. 2, the first driving motor 151 may be electrically connected to the selector 40. The first driving motor 151 may change its rotation direction as the sliding mode or the swing mode is selected by the first switch 41 or the second switch 42 of the selector 40, and thus the first door-side clamp member 131 and the second door-side clamp member 132 may clamp or release the door-side base 125 of the door-side hinge element 120.

When the sliding mode is selected by the first switch 41 of the selector 40, the first door-side clamp member 131 and the second door-side clamp member 132 may move toward the door-side bracket 135 by a forward rotation (clockwise rotation) of the first driving motor 151 as illustrated in FIG. 18, and thus the first door-side grip portion 133 of the first door-side clamp member 131 and the second door-side grip portion 134 of the second door-side clamp member 132 may clamp the door-side base 125 of the door-side hinge element 120.

When the swing mode is selected by the second switch 42 of the selector 40, the first door-side clamp member 131 and the second door-side clamp member 132 may move away from the door-side bracket 135 by a reverse rotation (counterclockwise rotation) of the first driving motor 151 as illustrated in FIG. 19, and thus the first door-side grip portion 133 of the first door-side clamp member 131 and the second door-side grip portion 134 of the second door-side clamp member 132 may release the door-side base 125 of the door-side hinge element 120.

Figure 21:
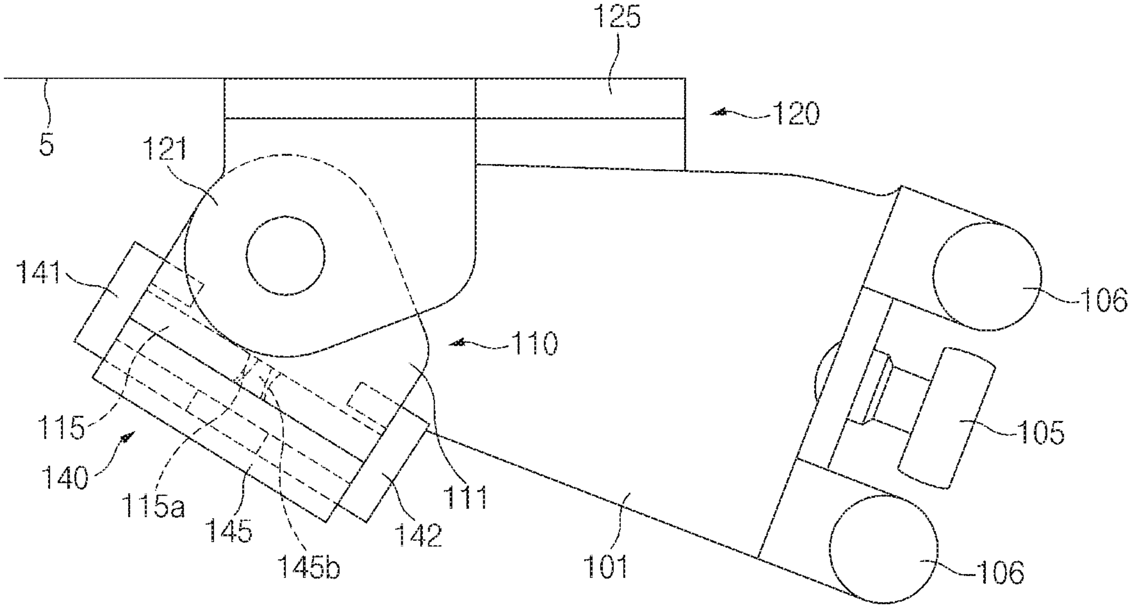
FIG. 21 illustrates a state in which a roller-side hinge element of a center roller unit is connected to a frame-side docking unit in a vehicle door opening and closing apparatus according to an exemplary embodiment of the present disclosure.
Figure 22:
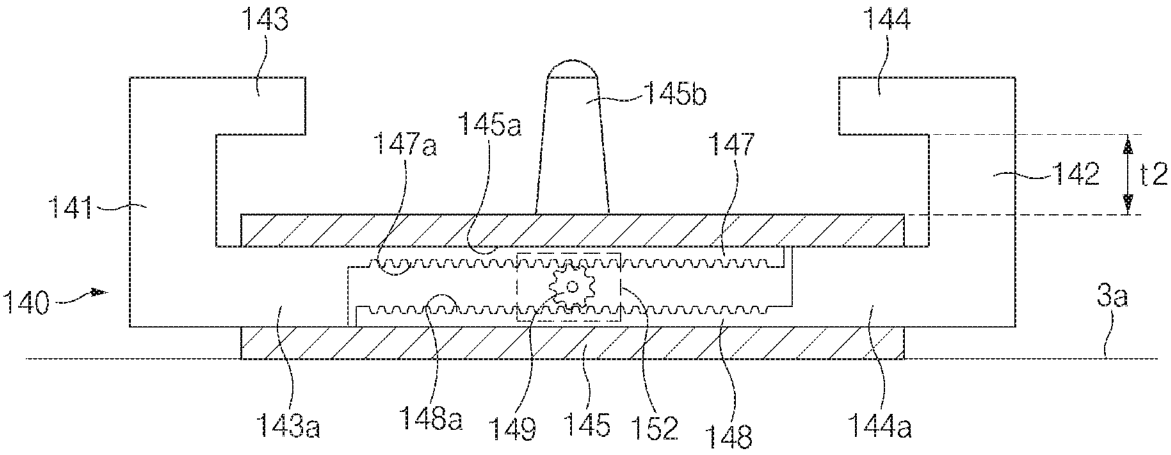
FIG. 22 illustrates a cross-sectional view of a frame-side docking unit according to an exemplary embodiment of the present disclosure.

Referring to FIGS. 21 and 22, according to an exemplary embodiment, the frame-side docking unit 140 may include a frame-side bracket 145 and first and second frame-side clamp members 141 and 42 which are movable in a direction approaching or moving away from the frame-side bracket 145. The first frame-side clamp member 141 and the second frame-side clamp member 142 may move opposite to each other with respect to the frame-side bracket 145 so that they may symmetrically clamp or release both edges of the roller-side base 115 of the roller-side hinge element 110.

The frame-side bracket 145 may be fixed to the door frame 3*a* by welding, using fasteners, and/or the like. The frame-side bracket 145 may have a first frame-side cavity 145*a*.

The first frame-side clamp member 141 may include a first frame-side grip portion 143 and a first frame-side extension portion 143*a* extending toward the second frame-side clamp member 142. The first frame-side grip portion 143 and the first frame-side extension portion 143*a* may be spaced apart from each other.

The first frame-side grip portion 143 may releasably clamp the roller-side base 115 of the roller-side hinge element 110. In particular, the first frame-side grip portion 143 may have a shape corresponding to that of one edge of the roller-side base 115. One surface of the frame-side bracket 145 may be fixed to the door frame 3*a* by welding, using fasteners, and/or the like. The first frame-side grip portion 143 may be spaced apart from the other surface of the frame-side bracket 145 by a predetermined gap t2. The gap t2 between the other surface of the frame-side bracket 145 and a surface of the first frame-side grip portion 143 facing the frame-side bracket 145 may correspond to a thickness of the roller-side base 115, and thus one edge of the roller-side base 115 may be firmly clamped by the frame-side bracket 145 and the first frame-side grip portion 143.

The first frame-side extension portion 143*a* may be movably received in the first frame-side cavity 145*a* of the frame-side bracket 145. A first frame-side rack portion 147 may extend from the first frame-side extension portion 143*a* toward the second frame-side clamp member 142, and the first frame-side rack portion 147 may have first frame-side rack teeth 147*a* arranged in a longitudinal direction of the first frame-side rack portion 147.

As the first frame-side clamp member 141 moves to approach the frame-side bracket 145, the first frame-side grip portion 143 may clamp one edge of the roller-side base 115 of the roller-side hinge element 110. As the first frame-side clamp member 141 moves away from the frame-side bracket 145, the first frame-side grip portion 143 may release one edge of the roller-side base 115 of the roller-side hinge element 110.

The second frame-side clamp member 142 may include a second frame-side grip portion 144 and a second frame-side extension portion 144*a* extending toward the first frame-side clamp member 141. The second frame-side grip portion 144 and the second frame-side extension portion 144*a* may be spaced apart from each other.

The second frame-side grip portion 144 may releasably clamp the roller-side base 115 of the roller-side hinge element 110. In particular, the second frame-side grip portion 144 may have a shape corresponding to that of the other edge of the roller-side base 115.

The second frame-side grip portion 144 may be spaced apart from the other surface of the frame-side bracket 145 by the predetermined gap t2. The gap t2 between the other surface of the frame-side bracket 145 and a surface of the second frame-side grip portion 144 facing the frame-side bracket 145 may correspond to the thickness of the roller-side base 115, and thus the other edge of the roller-side base 115 may be firmly clamped by the frame-side bracket 145 and the second frame-side grip portion 144.

The second frame-side extension portion 144*a* may be movably received in the first frame-side cavity 145*a* of the frame-side bracket 145. A second frame-side rack portion 148 may extend from the second frame-side extension portion 14*a* toward the first frame-side clamp member 141, and the second frame-side rack portion 148 may have second frame-side rack teeth 148*a* arranged in a longitudinal direction of the second frame-side rack portion 148.

A frame-side pinion 149 may be disposed between the first frame-side rack portion 147 and the second frame-side rack portion 148. The frame-side pinion 149 may mesh with the first frame-side rack teeth 147*a* of the first frame-side rack portion 147 and the second frame-side rack teeth 148*a* of the second frame-side rack portion 148.

The frame-side pinion 149 may engage with a driving shaft of a second driving motor 152, and the second driving motor 152 may be a bidirectional motor rotatable in both directions. The frame-side pinion 149 may be rotatable in both directions by the second driving motor 152.

Referring to FIG. 2, the second driving motor 152 may be electrically connected to the selector 40. The second driving motor 152 may change its rotation direction as the sliding mode or the swing mode is selected by the first switch 41 or the second switch 42 of the selector 40, and thus the first frame-side clamp member 141 and the second frame-side clamp member 142 may clamp or release the roller-side base 115 of the roller-side hinge element 110.

When the sliding mode is selected by the first switch 41 of the selector 40, the first frame-side clamp member 141 and the second frame-side clamp member 142 may move toward the frame-side bracket 145 by a forward rotation (clockwise rotation) of the second driving motor 152 as illustrated in FIG. 21, and thus the first frame-side grip portion 143 of the first frame-side clamp member 141 and the second frame-side grip portion 144 of the second frame-side clamp member 142 may clamp the roller-side base 115 of the roller-side hinge element 110.

When the swing mode is selected by the second switch 42 of the selector 40, the first frame-side clamp member 141 and the second frame-side clamp member 142 may move away from the frame-side bracket 145 by a reverse rotation (counterclockwise rotation) of the second driving motor 152, and thus the first frame-side grip portion 143 of the first frame-side clamp member 141 and the second frame-side grip portion 144 of the second frame-side clamp member 142 may release the roller-side base 115 of the roller-side hinge element 110.

Referring to FIG. 21, the roller-side base 115 of the roller-side hinge element 110 may have a guide hole 15*a*, and the frame-side bracket 145 of the frame-side docking unit 140 may have a guide projection 145*b*. When the roller-side hinge element 110 is clamped to the frame-side docking unit 140, the guide projection 145*b* of the frame-side bracket 145 may be inserted into the guide hole 15*a* of the roller-side base 115, and thus the roller-side hinge element 110 may not only be aligned with the frame-side bracket 145 of the frame-side docking unit 140, but also be more firmly clamped to the frame-side bracket 145 of the frame-side docking unit 140.

Figure 23:
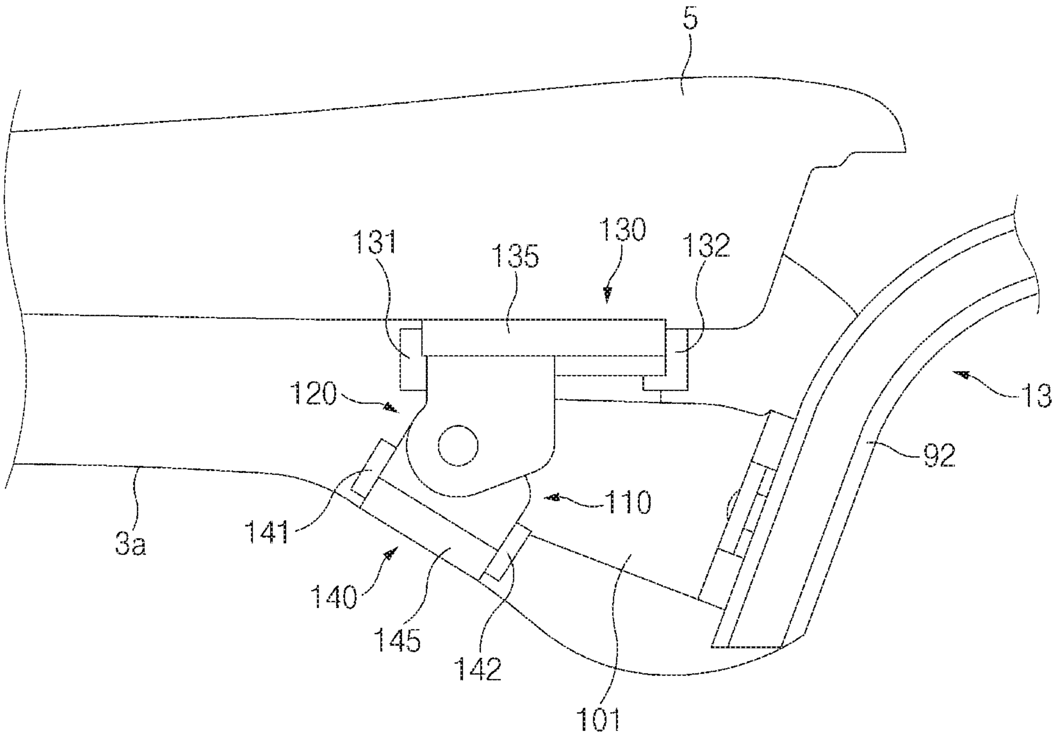
FIG. 23 illustrates a state in which a center roller unit is connected to a door-side docking unit and a frame-side docking unit in a vehicle door opening and closing apparatus according to an exemplary embodiment of the present disclosure.

Referring to FIG. 23, when the vehicle door 5 is closed, the door-side hinge element 120 of the center roller unit 23 may be connected to the vehicle door 5 by the door-side docking unit 130, and the roller-side hinge element 110 of the center roller unit 23 may be connected to the door frame 3*a* by the frame-side docking unit 140 so that the vehicle door 5 may be kept in a closed state.

Figure 24:
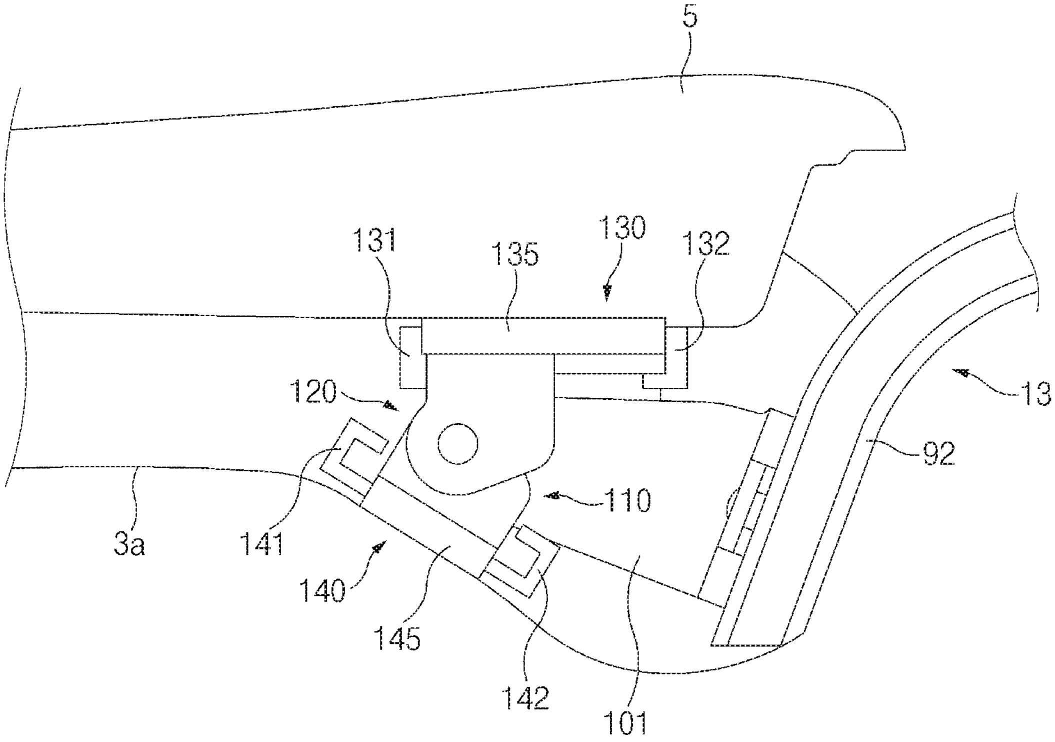
FIG. 24 illustrates a state in which a center roller unit is connected to a door-side docking unit and the center roller unit is released from a frame-side docking unit in a vehicle door opening and closing apparatus according to an exemplary embodiment of the present disclosure.
Figure 25:
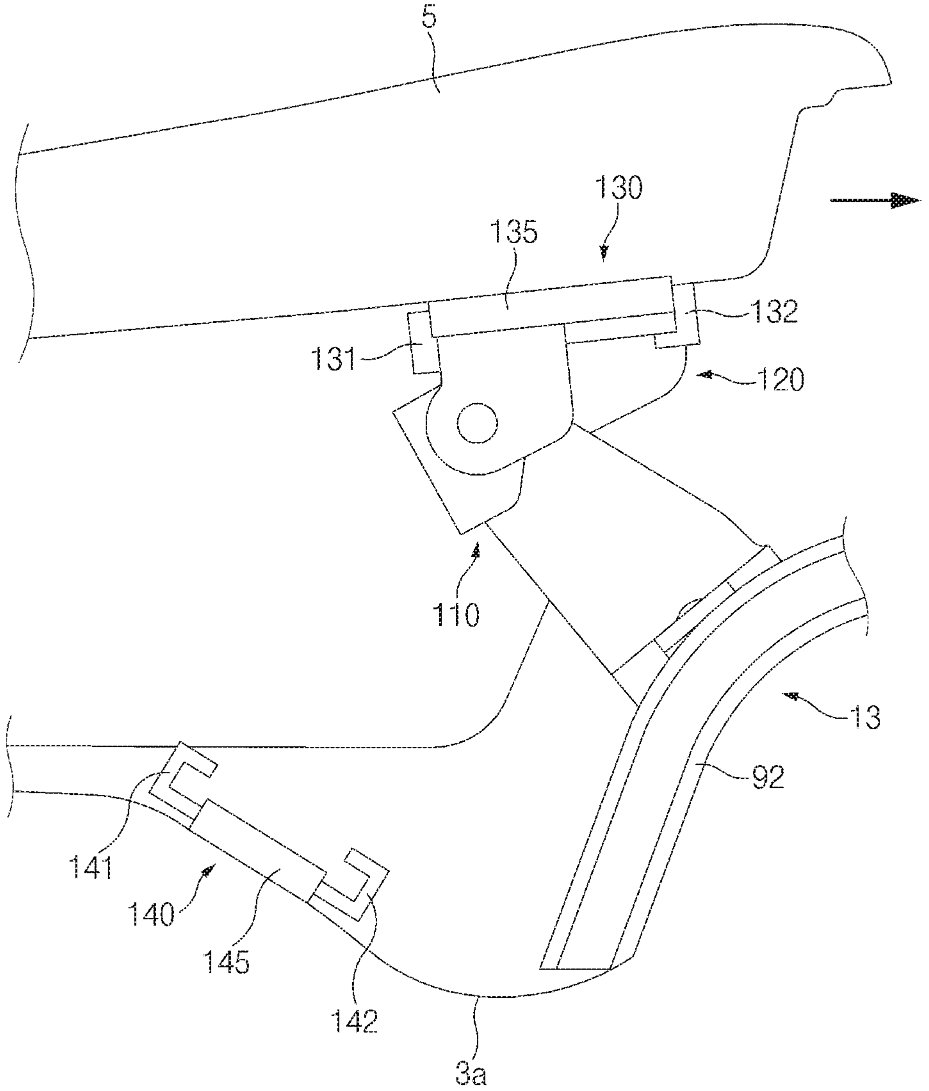
FIG. 25 illustrates a state in which a vehicle door is opened and closed in a sliding mode in a vehicle door opening and closing apparatus according to an exemplary embodiment of the present disclosure.

When the sliding mode is selected by the first switch 41 of the selector 40, the first and second frame-side clamp members 141 and 142 of the frame-side docking unit 140 may release the roller-side hinge element 110 of the center roller unit 23 and the first and second door-side clamp members 131 and 132 of the door-side docking unit 130 may clamp the door-side hinge element 120 of the center roller unit 23 as illustrated in FIG. 24. Then, the vehicle door 5 may be allowed to open and close in the sliding mode as illustrated in FIG. 25.

Figure 26:
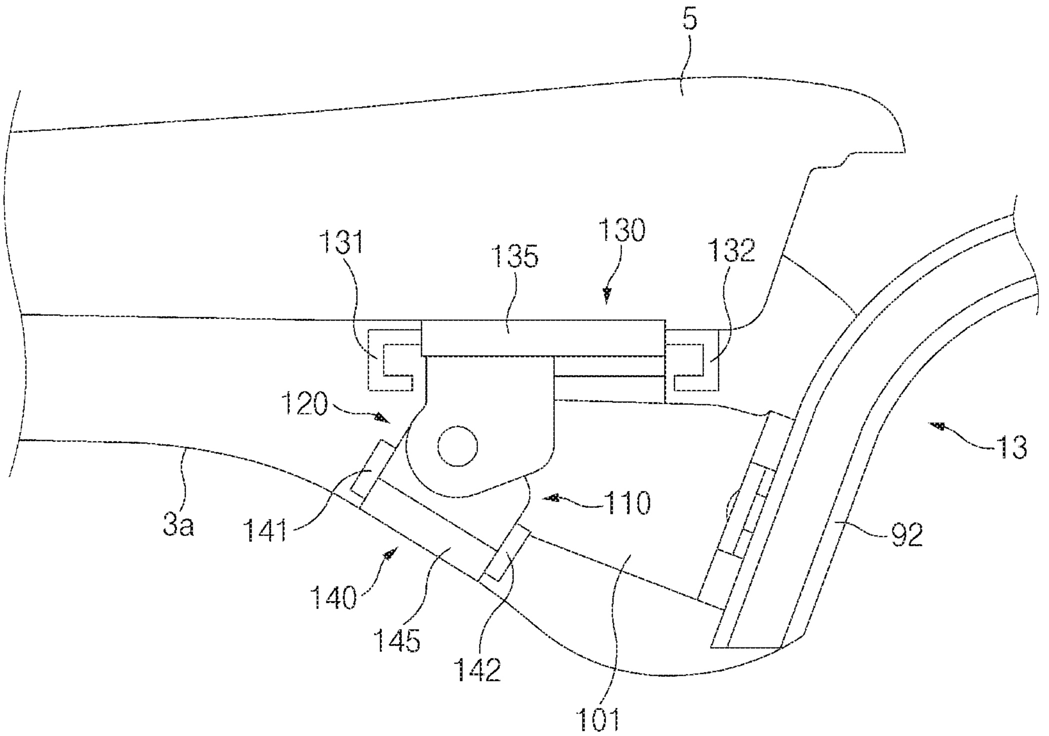
FIG. 26 illustrates a state in which a center roller unit is connected to a frame-side docking unit and the center roller unit is released from a door-side docking unit in a vehicle door opening and closing apparatus according to an exemplary embodiment of the present disclosure.
Figure 27:
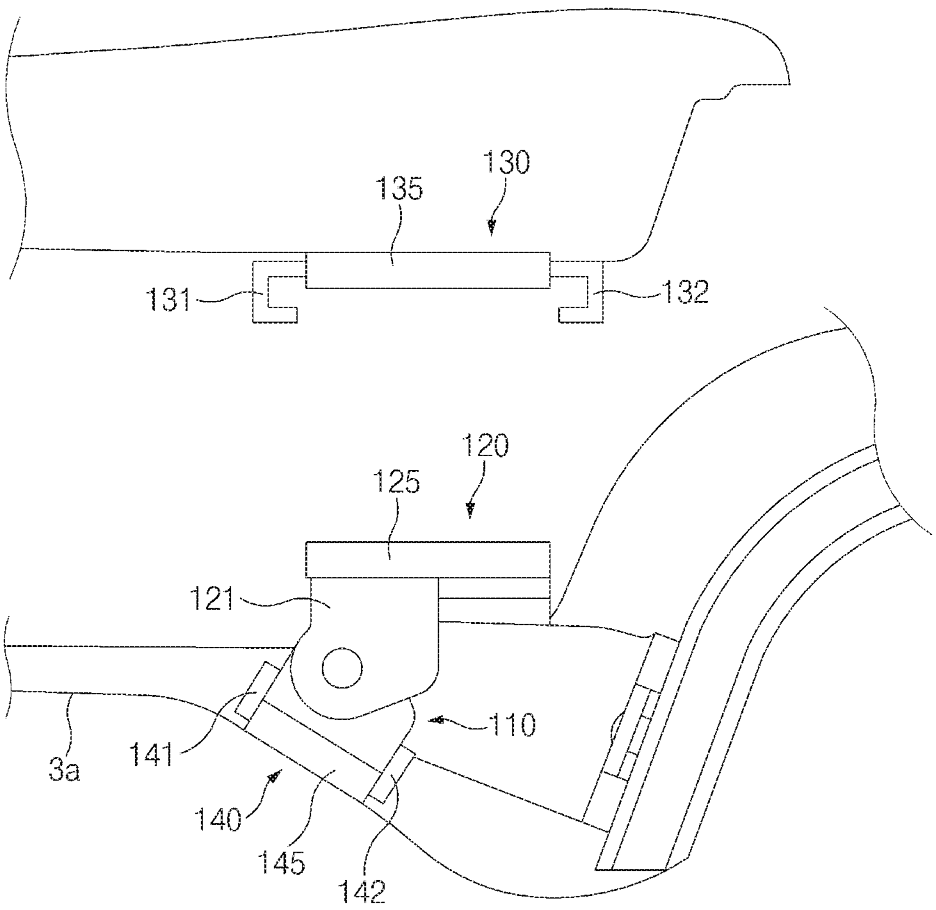
FIG. 27 illustrates a state in which a vehicle door is opened and closed in a swing mode in a vehicle door opening and closing apparatus according to an exemplary embodiment of the present disclosure.

When the swing mode is selected by the second switch 42 of the selector 40, the first and second door-side clamp members 131 and 132 of the door-side docking unit 130 may release the door-side hinge element 120 of the center roller unit 23 and the first and second frame-side clamp members 141 and 142 of the frame-side docking unit 140 may clamp the roller-side hinge element 110 of the center roller unit 23 as illustrated in FIG. 26. Then, the vehicle door 5 may be allowed to open and close in the swing mode as illustrated in FIG. 26.

Figure 28:
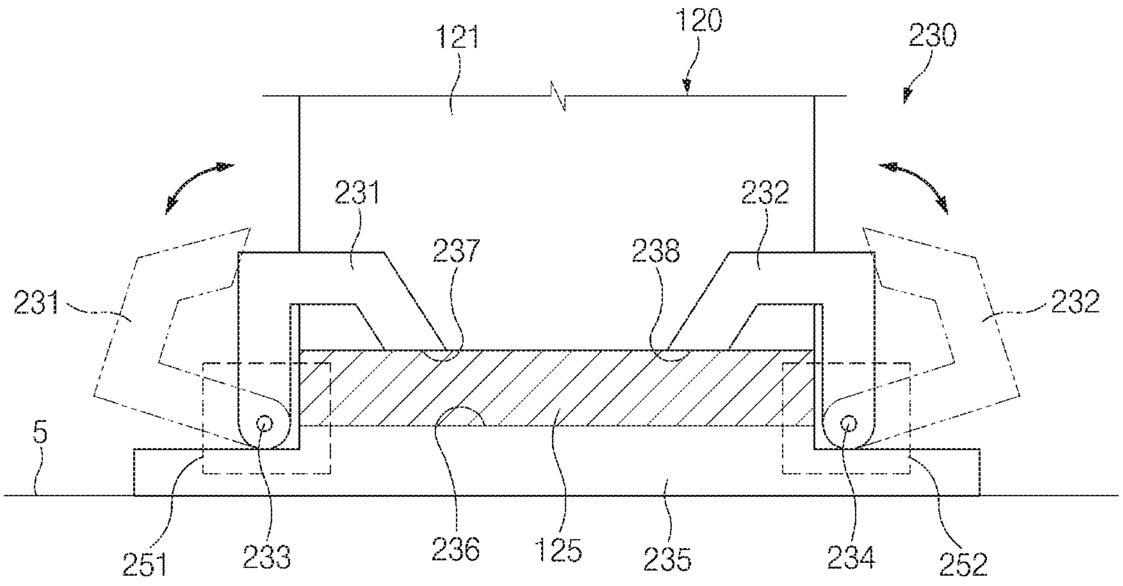
FIG. 28 illustrates a door-side docking unit according to another exemplary embodiment of the present disclosure.

FIG. 28 illustrates a door-side docking unit 230 according to another exemplary embodiment of the present disclosure.

Referring to FIG. 28, the door-side docking unit 230 may include a door-side bracket 235, a first door-side clamp member 231 pivotally mounted on one side of the door-side bracket 235 through a first door-side pivot pin 233, and a second door-side clamp member 232 pivotally mounted on the other side of the door-side bracket 235 through a second door-side pivot pin 234.

The door-side bracket 235 may be fixed to the vehicle door 5 by welding, using fasteners, and/or the like. The door-side bracket 235 may have a seat surface 236 supporting the door-side base 125 of the door-side hinge element 120.

The first door-side clamp member 231 and the second door-side clamp member 232 may move opposite to each other with respect to the door-side bracket 235.

The first door-side clamp member 231 may have a first door-side grip surface 237. When the first door-side clamp member 231 pivots toward the door-side bracket 235, the first door-side grip surface 237 may grip one edge of the door-side base 125. The second door-side clamp member 232 may have a second door-side grip surface 238. When the second door-side clamp member 232 pivots toward the door-side bracket 235, the second door-side grip surface 238 may grip the other edge of the door-side base 125.

As indicated by a solid line in FIG. 28, as the first door-side clamp member 231 and the second door-side clamp member 232 pivot toward the door-side bracket 235, the door-side base 125 of the door-side hinge element 120 may be clamped by the first door-side clamp member 231 and the second door-side clamp member 232.

As indicated by a dotted line in FIG. 28, as the first door-side clamp member 231 and the second door-side clamp member 232 pivot away from the door-side bracket 235, the door-side base 125 of the door-side hinge element 120 may be released from the first door-side clamp member 231 and the second door-side clamp member 232.

According to an exemplary embodiment, the first door-side clamp member 231 may be rotated by a first driving motor 251, and the second door-side clamp member 232 may be rotated by a second driving motor 252.

According to another exemplary embodiment, the first door-side clamp member 231 and the second door-side clamp member 232 may be rotated by a single driving motor. For example, the first door-side pivot pin 233 and the second door-side pivot pin 234 may be connected to a single driving motor through a transmission mechanism such as a belt drive or a gear train. The transmission mechanism may be configured to individually transmit power of one driving motor to the first door-side pivot pin 233 of the first door-side clamp member 231 and the second door-side pivot pin 234 of the second door-side clamp member 232.

Since the other configurations and operations in these exemplary embodiments are similar to or the same as those in the preceding exemplary embodiments, a detailed description thereof will be omitted.

Figure 29:
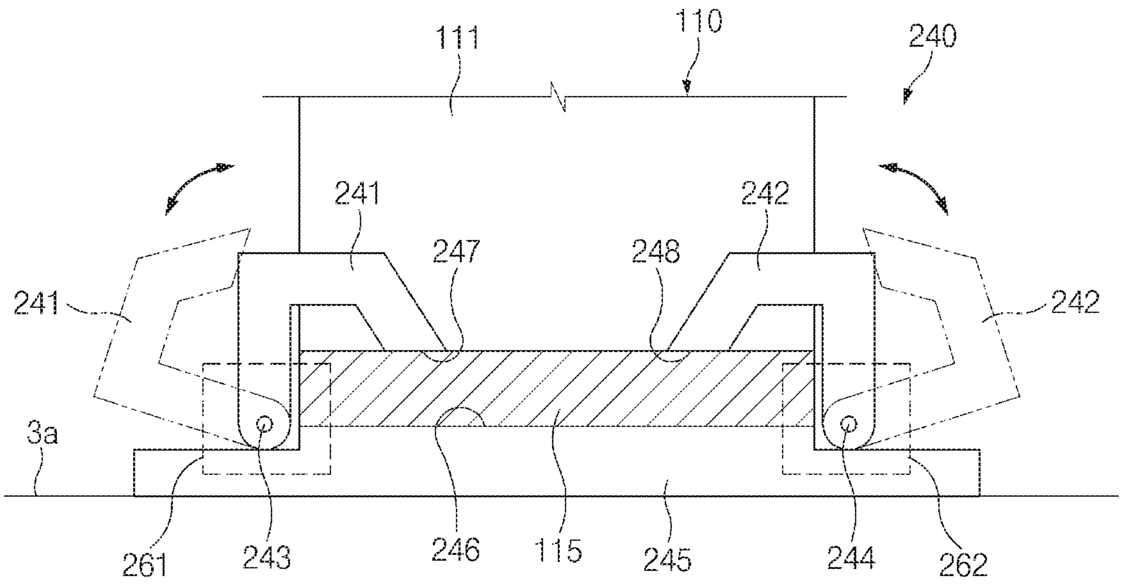
FIG. 29 illustrates a frame-side docking unit according to another exemplary embodiment of the present disclosure.

FIG. 29 illustrates a frame-side docking unit 240 according to another exemplary embodiment of the present disclosure.

Referring to FIG. 29, the frame-side docking unit 240 may include a frame-side bracket 245, a first frame-side clamp member 241 pivotally mounted on one side of the frame-side bracket 245 through a first frame-side pivot pin 243, and a second frame-side clamp member 242 pivotally mounted on the other side of the frame-side bracket 245 through a second frame-side pivot pin 244.

The frame-side bracket 245 may be fixed to the door frame 3*a* by welding, using fasteners, and/or the like. The frame-side bracket 245 may have a seat surface 246 supporting the roller-side base 115 of the roller-side hinge element 110.

The first frame-side clamp member 241 and the second frame-side clamp member 242 may move opposite to each other with respect to the frame-side bracket 245.

The first frame-side clamp member 241 may have a first frame-side grip surface 247. When the first frame-side clamp member 241 pivots toward the frame-side bracket 245, the first frame-side grip surface 247 may grip one edge of the roller-side base 115. The second frame-side clamp member 242 may have a second frame-side grip surface 248. When the second frame-side clamp member 242 pivots toward the frame-side bracket 245, the second frame-side grip surface 248 may grip the other edge of the roller-side base 115.

As indicated by a solid line in FIG. 29, as the first frame-side clamp member 241 and the second frame-side clamp member 242 pivot toward the frame-side bracket 245, the roller-side base 115 of the roller-side hinge element 110 may be clamped by the first frame-side clamp member 241 and the second frame-side clamp member 242.

As indicated by a dotted line in FIG. 29, as the first frame-side clamp member 241 and the second frame-side clamp member 242 pivot away from the frame-side bracket 245, the roller-side base 115 of the roller-side hinge element 110 may be released from the first frame-side clamp member 241 and the second frame-side clamp member 242.

According to an exemplary embodiment, the first frame-side clamp member 241 may be rotated by a third driving motor 261, and the second door-side clamp member 242 may be rotated by a fourth driving motor 262.

According to another exemplary embodiment, the first frame-side clamp member 241 and the second frame-side clamp member 242 may be rotated by a single driving motor. For example, the first frame-side pivot pin 243 and the second frame-side pivot pin 244 may be connected to a single driving motor through a transmission mechanism such as a belt drive or a gear train. The transmission mechanism may be configured to individually transmit power of one driving motor to the first frame-side pivot pin 243 of the first frame-side clamp member 241 and the second frame-side pivot pin 244 of the second frame-side clamp member 242.

Since the other configurations and operations in these exemplary embodiments are similar to or the same as those in the preceding exemplary embodiments, a detailed description thereof will be omitted.

Figure 30:
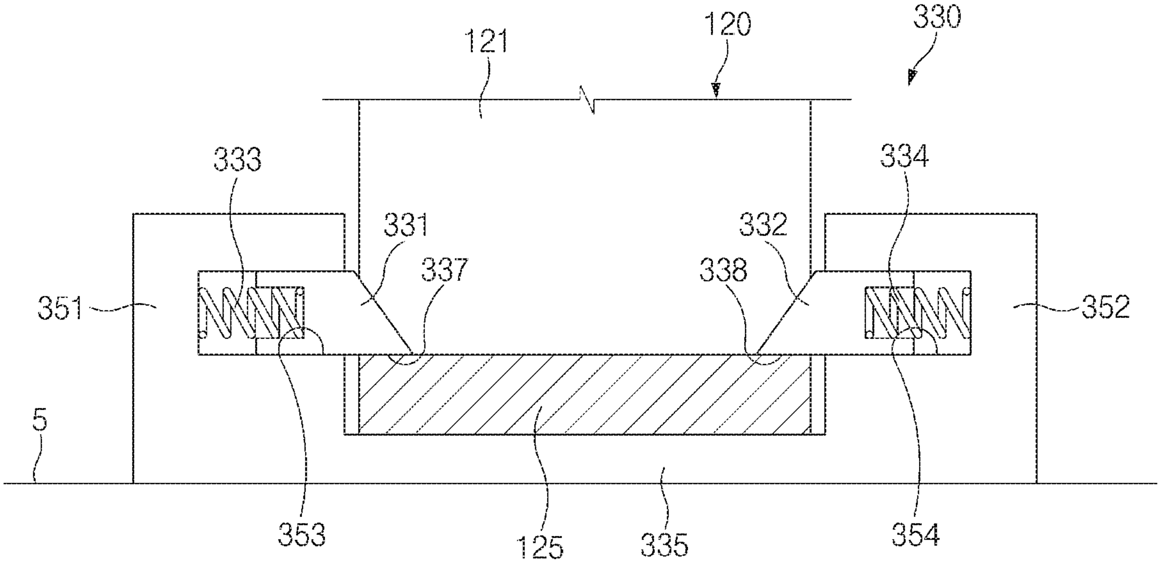
FIG. 30 illustrates a door-side docking unit according to another exemplary embodiment of the present disclosure.

Referring to FIG. 30, according to another exemplary embodiment, a door-side docking unit 330 may include a door-side bracket 335, a first door-side clamp member 331 mounted on one side of the door-side bracket 335 in a manner that is biased toward the center of the door-side bracket 335 by a first door-side biasing element 333, and a second door-side clamp member 332 mounted on the other side of the door-side bracket 335 in a manner that is biased toward the center of the door-side bracket 335 by a second door-side biasing element 334.

The door-side bracket 335 may be fixed to the vehicle door 5 by welding, using fasteners, and/or the like. The door-side bracket 335 may have a first door-side sidewall 351 and a second door-side sidewall 352 spaced apart from each other, and the door-side base 125 of the door-side hinge element 120 may be received between the first door-side sidewall 351 and the second door-side sidewall 352. The first door-side sidewall 351 may have a first door-side guide recess 353 receiving the first door-side biasing element 333 and guiding the movement of the first door-side clamp member 331. The second door-side sidewall 352 may have a second door-side guide recess 354 receiving the second door-side biasing element 334 and guiding the movement of the second door-side clamp member 332.

The first door-side clamp member 331 may have a first door-side grip surface 337. As the first door-side clamp member 331 moves on a surface of the door-side base 125 which is to come into contact with the first door-side grip surface 337, the first door-side grip surface 337 may releasably grip one edge of the door-side base 125. The second door-side clamp member 332 may have a second door-side grip surface 338. As the second door-side clamp member 332 moves on the surface of the door-side base 125 which is to come into contact with the second door-side grip surface 338, the second door-side grip surface 338 may releasably grip the other edge of the door-side base 125.

As the first door-side clamp member 331 and the second door-side clamp member 332 move toward the center of the door-side bracket 335, the first door-side clamp member 331 and the second door-side clamp member 332 may press the door-side base 125 of the door-side hinge element 120, and thus the door-side base 125 of the door-side hinge element 120 may be clamped by the first door-side clamp member 331 and the second door-side clamp member 332.

As the first door-side clamp member 331 and the second door-side clamp member 332 move away from the door-side bracket 335, the first door-side grip surface 337 of the first door-side clamp member 331 and the second door-side grip surface 338 of the second door-side clamp member 332 may be spaced apart from the door-side base 125 of the door-side hinge element 120, and thus the door-side base 125 of the door-side hinge element 120 may be released from the first door-side clamp member 331 and the second door-side clamp member 332.

The first door-side clamp member 331 may be moved by a driving means such that it may be received in the first door-side guide recess 353, and the second door-side clamp member 332 may be moved by a driving means such that it may be received in the second door-side guide recess 354. For example, the first door-side clamp member 331 may be moved toward the first door-side sidewall 351 by a driving means such as a linear motor, and the second door-side clamp member 332 may be moved toward the second door-side sidewall 352 by a driving means such as a linear motor. As the first door-side clamp member 331 overcomes a force of the first door-side biasing element 333 and is received in the first door-side guide recess 353, and the second door-side clamp member 332 overcomes a force of the second door-side biasing element 334 and is received in the second door-side guide recess 354, the door-side base 125 of the door-side hinge element 120 may be released from the first door-side clamp member 331 and the second door-side clamp member 332.

Since the other configurations and operations in this exemplary embodiment are similar to or the same as those in the preceding exemplary embodiments, a detailed description thereof will be omitted.

Figure 31:
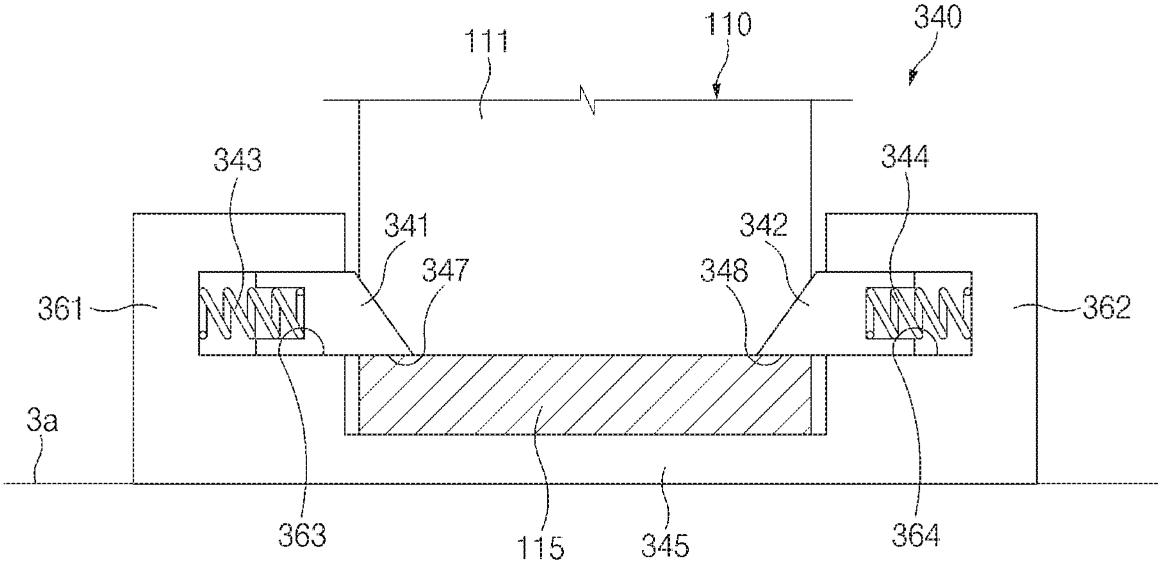
FIG. 31 illustrates a frame-side docking unit according to another exemplary embodiment of the present disclosure.

Referring to FIG. 31, according to another exemplary embodiment, a frame-side docking unit 340 may include a frame-side bracket 345, a first frame-side clamp member 341 mounted on one side of the frame-side bracket 345 in a manner that is biased toward the center of the frame-side bracket 345 by a first frame-side biasing element 343, and a second frame-side clamp member 342 mounted on the other side of the frame-side bracket 345 in a manner that is biased toward the center of the frame-side bracket 345 by a second frame-side biasing element 344.

The frame-side bracket 345 may be fixed to the door frame **3*a* by welding, using fasteners, and/or the like. The frame-side bracket 345 may have a first frame-side sidewall 361 and a second frame-side sidewall 362 spaced apart from each other, and the roller-side base 115 of the roller-side hinge element 110 may be received between the first frame-side sidewall 361 and the second frame-side sidewall 362. The first frame-side sidewall 361 may have a first frame-side guide recess 363 receiving the first frame-side biasing element 343 and guiding the movement of the first frame-side clamp member 341. The second frame-side sidewall 362 may have a second frame-side guide recess 364 receiving the second frame-side biasing element 344 and guiding the movement of the second frame-side clamp member 342**.

The first frame-side clamp member 341 may have a first frame-side grip surface 347. As the first frame-side clamp member 341 moves on a surface of the roller-side base 115 which is to come into contact with the first frame-side grip surface 347, the first frame-side grip surface 347 may releasably grip one edge of the roller-side base 115. The second frame-side clamp member 342 may have a second frame-side grip surface 348. As the second frame-side clamp member 342 moves on the surface of the roller-side base 115 which is to come into contact with the second frame-side grip surface 348, the second frame-side grip surface 348 may releasably grip the other edge of the roller-side base 115.

As the first frame-side clamp member 341 and the second frame-side clamp member 342 move toward the center of the frame-side bracket 345, the first frame-side clamp member 341 and the second frame-side clamp member 342 may press the roller-side base 115 of the roller-side hinge element 110, and thus the roller-side base 115 of the roller-side hinge element 110 may be clamped by the first frame-side clamp member 341 and the second frame-side clamp member 342.

As the first frame-side clamp member 341 and the second frame-side clamp member 342 move away from the frame-side bracket 345, the first frame-side grip surface 347 of the first frame-side clamp member 341 and the second frame-side grip surface 348 of the second frame-side clamp member 342 may be spaced apart from the roller-side base 115 of the roller-side hinge element 110, and thus the roller-side base 115 of the roller-side hinge element 110 may be released from the first frame-side clamp member 341 and the second frame-side clamp member 342.

The first frame-side clamp member 341 may be moved by a driving means such that it may be received in the first frame-side guide recess 363, and the second frame-side clamp member 342 may be moved by a driving means such that it may be received in the second frame-side guide recess 364. For example, the first frame-side clamp member 341 may be moved toward the first frame-side sidewall 361 by a driving means such as a linear motor, and the second frame-side clamp member 342 may be moved toward the second frame-side sidewall 362 by a driving means such as a linear motor. As the first frame-side clamp member 341 overcomes a force of the first frame-side biasing element 343 and is received in the first frame-side guide recess 363, and the second frame-side clamp member 342 overcomes a force of the second frame-side biasing element 344 and is received in the second frame-side guide recess 364, the roller-side base 115 of the roller-side hinge element 110 may be released from the first frame-side clamp member 341 and the second frame-side clamp member 342.

Since the other configurations and operations in this exemplary embodiment are similar to or the same as those in the preceding exemplary embodiments, a detailed description thereof will be omitted.

FIGS. 1 to 32 illustrate the vehicle door opening and closing apparatus according to exemplary embodiments of the present disclosure applied to the rear door 5. However, the vehicle door opening and closing apparatus according to exemplary embodiments of the present disclosure may be applied to various vehicle doors, such as front doors, in addition to rear doors.

Figure 33:
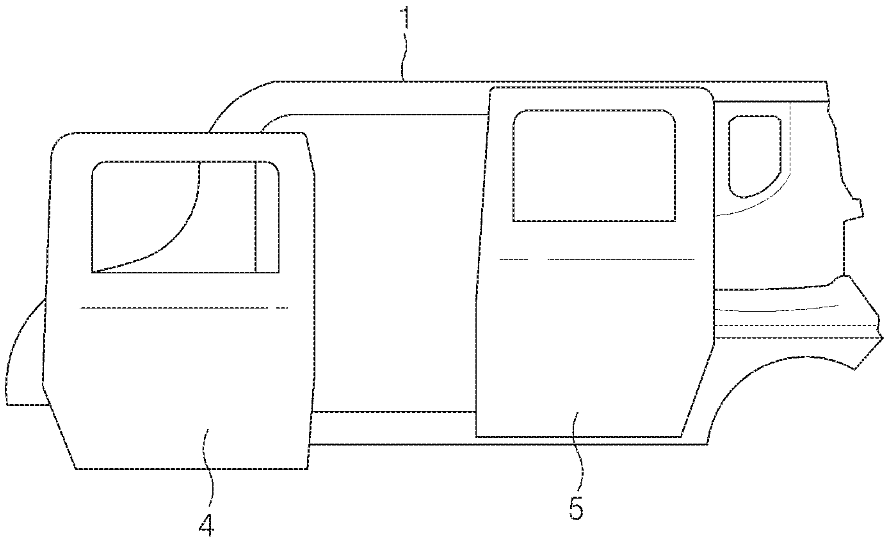
FIG. 33 illustrates a vehicle door opening and closing apparatus according to an exemplary embodiment of the present disclosure, which is applied to a front door of a vehicle, in a state in which the front door is opened in a sliding mode.
Figure 34:
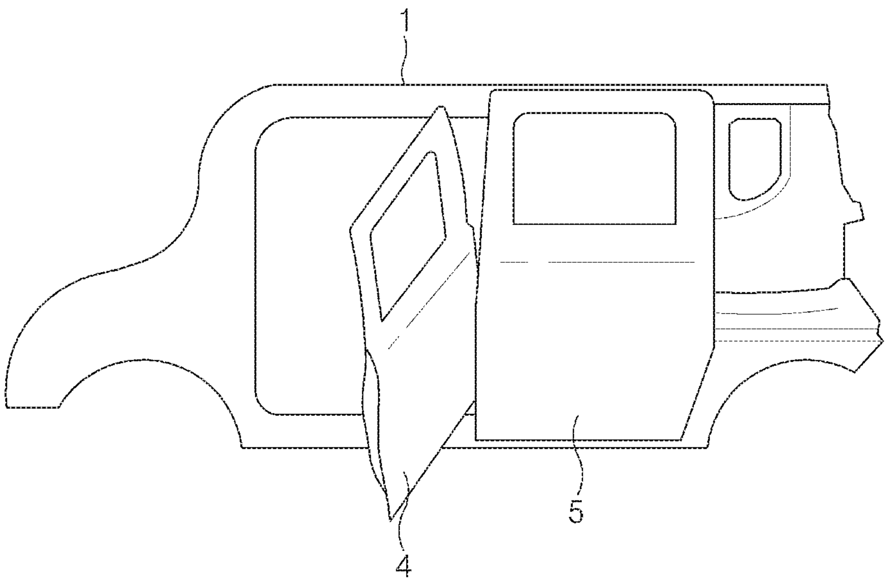
FIG. 34 illustrates a state in which the front door of FIG. 33 is opened in a swing mode.

FIGS. 33 and 34 illustrate the vehicle door opening and closing apparatus according to exemplary embodiments of the present disclosure applied to the front door 4. FIG. 33 illustrates a state in which the front door 4 is opened in the sliding mode, and FIG. 34 illustrates a state in which the front door 4 is opened in the swing mode.

Figure 35:
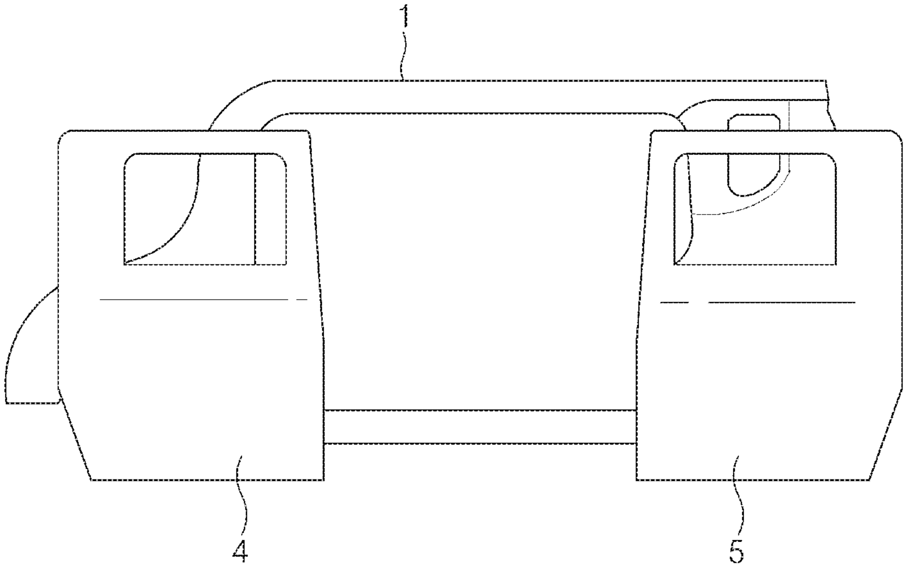
FIG. 35 illustrates a vehicle door opening and closing apparatus according to an exemplary embodiment of the present disclosure, which is applied to a front door and a rear door of a vehicle, in a state in which the front door and the rear door are opened in a sliding mode.
Figure 36:
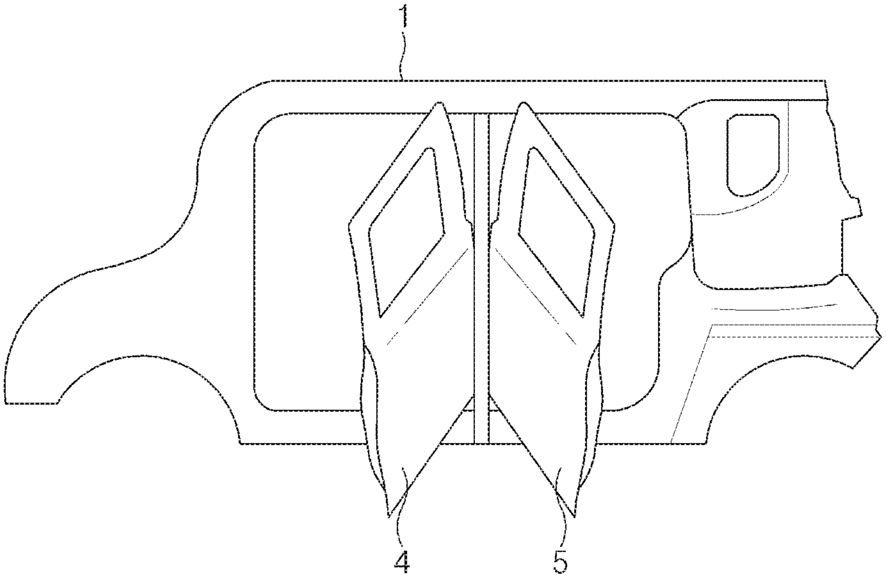
FIG. 36 illustrates a state in which the front door and the rear door of FIG. 35 are opened in a swing mode.

FIGS. 35 and 36 illustrate the vehicle door opening and closing apparatus according to exemplary embodiments of the present disclosure applied to both the front door 4 and the rear door 5. FIG. 35 illustrates a state in which the front door 4 and the rear door 5 are opened in the sliding mode, and FIG. 36 illustrates a state in which the front door 4 and the rear door 5 are opened in the swing mode.

As set forth above, the vehicle door opening and closing apparatus according to exemplary embodiments of the present disclosure may perform the opening and closing operations of the vehicle door by selectively switching the sliding mode and the swing mode, thereby meeting the needs of customers such as convenience and diversity. In addition, it may select the opening and closing operations of the vehicle door by taking the customer's situation and environment into consideration, thereby improving convenience and quality.

In particular, the vehicle door opening and closing apparatus may allow the center roller unit to be releasably connected to the vehicle door and the door frame of the vehicle body as either the swing mode or the sliding mode is selected, thereby reliably opening and closing the vehicle door in either the swing mode or the sliding mode.

In terms of vehicle specifications, the vehicle door opening and closing structure may be standardized, regardless of vehicle models. Thus, the manufacturing cost and investment cost may be significantly reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle comprising:
- a vehicle body having a door frame defining a door aperture;
- a vehicle door;
- a rail mounted on the vehicle body;
- a roller unit mounted on the vehicle door and configured to move along the rail and allow the vehicle door to open and close in a sliding mode and a swing mode;
- a center rail extending from an edge of the door aperture;
- a center roller unit including rollers configured to be guided along the center rail, a roller bracket having the rollers mounted thereon, a roller-side hinge element connected to the roller bracket, and a door-side hinge element rotatably connected to the roller-side hinge element by a hinge pin;
- a door-side docking unit releasably connecting the door-side hinge element to the vehicle door; and
- a frame-side docking unit releasably connecting the roller-side hinge element to the door frame.

2. The vehicle according to claim 1, wherein the door-side docking unit includes:
a door-side bracket fixed to the vehicle door;
a first door-side clamp member slidably mounted on the door-side bracket; and
a second door-side clamp member opposite to the first door-side clamp member, and slidably mounted on the door-side bracket.

3. The vehicle according to claim 2, wherein the first and second door-side clamp members are configured to be movable in a direction approaching or moving away from the door-side bracket.

4. The vehicle according to claim 2, wherein:
the first door-side clamp member has a first door-side grip portion extending toward the second door-side clamp member; and
the second door-side clamp member has a second door-side grip portion extending toward the first door-side clamp member.

5. The vehicle according to claim 2, wherein:
the door-side bracket has a door-side cavity;
the first door-side clamp member has a first door-side rack portion configured to be movably received in the door-side cavity;
the second door-side clamp member has a second door-side rack portion configured to be movably received in the door-side cavity; and
the first and second door-side rack portions are configured to be moved by a door-side pinion.

6. The vehicle according to claim 5, wherein:
the door-side pinion is disposed between the first door-side rack portion and the second door-side rack portion;
the first door-side rack portion has first door-side rack teeth configured to mesh with the door-side pinion; and
the second door-side rack portion has second door-side rack teeth configured to mesh with the door-side pinion.

7. The vehicle according to claim 1, wherein the frame-side docking unit includes:
a frame-side bracket fixed to the door frame;
a first frame-side clamp member slidably mounted on the frame-side bracket; and
a second frame-side clamp member opposite to the first frame-side clamp member, and slidably mounted on the frame-side bracket.

8. The vehicle according to claim 7, wherein the first and second frame-side clamp members are configured to be movable in a direction approaching or moving away from the frame-side bracket.

9. The vehicle according to claim 7, wherein:
the first frame-side clamp member has a first frame-side grip portion extending toward the second frame-side clamp member; and
the second frame-side clamp member has a second frame-side grip portion extending toward the first frame-side clamp member.

10. The vehicle according to claim 7, wherein:
the frame-side bracket has a frame-side cavity;
the first frame-side clamp member has a first frame-side rack portion configured to be movably received in the frame-side cavity;
the second frame-side clamp member has a second frame-side rack portion configured to be movably received in the frame-side cavity; and
the first and second frame-side rack portions are configured to be moved by a frame-side pinion.

11. The vehicle according to claim 10, wherein:
the frame-side pinion is disposed between the first frame-side rack portion and the second frame-side rack portion;
the first frame-side rack portion has first frame-side rack teeth configured to mesh with the frame-side pinion; and
the second frame-side rack portion has second frame-side rack teeth configured to mesh with the frame-side pinion.

12. The vehicle according to claim 1, wherein:
the frame-side docking unit has a guide projection; and
the roller-side hinge element has a guide hole into which the guide projection is inserted.

13. The vehicle according to claim 1, wherein the door-side docking unit includes:
a door-side bracket fixed to the vehicle door;
a first door-side clamp member pivotally mounted on the door-side bracket; and
a second door-side clamp member opposite to the first door-side clamp member, and pivotally mounted on the door-side bracket.

14. The vehicle according to claim 1, wherein the frame-side docking unit includes:
a frame-side bracket fixed to the door frame;
a first frame-side clamp member pivotally mounted on the frame-side bracket; and
a second frame-side clamp member opposite to the first frame-side clamp member, and pivotally mounted on the frame-side bracket.

15. The vehicle according to claim 1, wherein the door-side docking unit includes:
a door-side bracket fixed to the vehicle door;
a first door-side clamp member mounted on the door-side bracket in a manner that is biased toward a center of the door-side bracket by a first door-side biasing element; and
a second door-side clamp member opposite to the first door-side clamp member, and mounted on the door-side bracket in a manner that is biased toward the center of the door-side bracket by a second door-side biasing element.

16. The vehicle according to claim 1, wherein the frame-side docking unit includes:
a frame-side bracket fixed to the door frame;
a first frame-side clamp member mounted on the frame-side bracket in a manner that is biased toward a center of the frame-side bracket by a first frame-side biasing element; and
a second frame-side clamp member opposite to the first frame-side clamp member, and mounted on the frame-side bracket in a manner that is biased toward the center of the frame-side bracket by a second frame-side biasing element.

17. A vehicle door opening and closing apparatus comprising:
a rail configured to be mounted on a vehicle body having a door frame defining a door aperture;
a roller unit configured to be mounted on a vehicle door and configured to move along the rail and allow the vehicle door to open and close in a sliding mode and a swing mode;
a center rail configured to extend from an edge of the door aperture;
a center roller unit including
rollers configured to be guided along the center rail and to be mounted on a roller bracket;

a roller-side hinge element configured to be connected to the roller bracket; and a door-side hinge element configured to be rotatably connected to the roller-side hinge element by a hinge pin;

a door-side docking unit configured to releasably connect the door-side hinge element to the vehicle door, and a frame-side docking unit configured to releasably connect the roller-side hinge element to the door frame.

18. The apparatus according to claim 17, wherein the door-side docking unit includes:

a door-side bracket configured to be fixed to the vehicle door;

a first door-side clamp member configured to be slidably mounted on the door-side bracket; and a second door-side clamp member configured to be opposite the first door-side clamp member, and configured to be slidably mounted on the door-side bracket;

wherein the first and second door-side clamp members are configured to be movable in a direction approaching or moving away from the door-side bracket;

wherein the first door-side clamp member has a first door-side grip portion extending toward the second door-side clamp member, and the second door-side clamp member has a second door-side grip portion extending toward the first door-side clamp member.

19. The apparatus according to claim 18, wherein:

the door-side bracket has a door-side cavity;

the first door-side clamp member has a first door-side rack portion configured to be movably received in the door-side cavity;

the second door-side clamp member has a second door-side rack portion configured to be movably received in the door-side cavity;

the first and second door-side rack portions are configured to be moved by a door-side pinion;

the door-side pinion is disposed between the first door-side rack portion and the second door-side rack portion;

the first door-side rack portion has first door-side rack teeth configured to mesh with the door-side pinion; and the second door-side rack portion has second door-side rack teeth configured to mesh with the door-side pinion.

20. A vehicle door opening and closing apparatus comprising:

a rail configured to be mounted on a vehicle body having a door frame defining a door aperture;

a roller unit configured to be mounted on a vehicle door and configured to move along the rail and allow the vehicle door to open and close in a sliding mode and a swing mode;

a center rail configured to extend from an edge of the door aperture;

a center roller unit including rollers configured to be guided along the center rail and to be mounted on a roller bracket;

a roller-side hinge element configured to be connected to the roller bracket; and a door-side hinge element configured to be rotatably connected to the roller-side hinge element by a hinge pin;

a door-side docking unit configured to releasably connect the door-side hinge element to the vehicle door, and a frame-side docking unit configured to releasably connect the roller-side hinge element to the door frame, the frame-side docking unit including:

a frame-side bracket configured to be fixed to the door frame;

a first frame-side clamp member configured to be slidably mounted on the frame-side bracket; and a second frame-side clamp member configured to be opposite the first frame-side clamp member, and configured to be slidably mounted on the frame-side bracket;

wherein the first and second frame-side clamp members are configured to be movable in a direction approaching or moving away from the frame-side bracket; and wherein the first frame-side clamp member has a first frame-side grip portion configured to extend toward the second frame-side clamp member, and the second frame-side clamp member has a second frame-side grip portion configured to extend toward the first frame-side clamp member.

* * * * *